A processing apparatus, optionally integrated into a device having a plurality of sensors including a magnetometer, generates navigational state estimates for the device. The processing apparatus has a magnetometer-assisted mode of operation in which measurements from the magnetometer are used to estimate the navigational state and an alternate mode of operation in which the navigational state of the device is estimated without measurements from the magnetometer. For a respective time period, the processing apparatus operates in the alternate mode of operation. During the respective time period, the processing apparatus collects a plurality of magnetometer measurements and determines whether they meet measurement-consistency requirements. If the measurements meet the measurement-consistency requirements, the processing apparatus transitions to the magnetometer-assisted mode of operation. If the measurements do not meet the measurement-consistency requirements, the processing apparatus continues to operate in the alternate mode of operation.

20 Claims, 10 Drawing Sheets

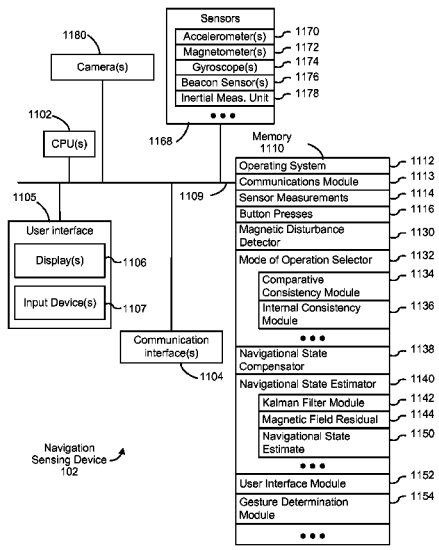

(51) Int. Cl.
*G01C 17/38* (2006.01)
*G06F 3/0346* (2013.01)

(56) References Cited

U.S. PATENT DOCUMENTS

| | | |
|---|---|---|
| 4,318,186 A | 3/1982 | Wynn |
| 4,467,272 A | 8/1984 | Hassler et al. |
| 4,516,770 A | 5/1985 | Brookes et al. |
| 4,641,246 A | 2/1987 | Halbert et al. |
| 4,816,748 A | 3/1989 | Tazawa et al. |
| 4,847,783 A | 7/1989 | Grace et al. |
| 5,128,671 A | 7/1992 | Thomas, Jr. |
| 5,161,311 A | 11/1992 | Esmer et al. |
| 5,239,264 A | 8/1993 | Hawks |
| 5,321,401 A | 6/1994 | White |
| 5,637,994 A | 6/1997 | Carder |
| 5,645,077 A | 7/1997 | Foxlin |
| 5,757,360 A | 5/1998 | Nitta et al. |
| 5,819,206 A | 10/1998 | Horton et al. |
| 5,874,941 A | 2/1999 | Yamada |
| 5,893,049 A | 4/1999 | Reggiardo |
| 6,072,467 A | 6/2000 | Walker |
| 6,157,894 A | 12/2000 | Hess et al. |
| 6,176,837 B1 | 1/2001 | Foxlin |
| 6,304,828 B1 | 10/2001 | Swanick et al. |
| 6,384,596 B1 | 5/2002 | Beyer |
| 6,882,086 B2 | 4/2005 | Kornbluh et al. |
| 7,139,983 B2 | 11/2006 | Kelts |
| 7,158,118 B2 | 1/2007 | Liberty |
| 7,216,055 B1 | 5/2007 | Horton et al. |
| 7,262,760 B2 | 8/2007 | Liberty |
| 7,285,964 B1 | 10/2007 | Hsu et al. |
| 7,296,363 B2 | 11/2007 | Danisch et al. |
| 7,305,630 B2 | 12/2007 | Hullender et al. |
| 7,307,411 B1 | 12/2007 | Hsu et al. |
| 7,350,303 B2 | 4/2008 | Rock et al. |
| 7,414,611 B2 | 8/2008 | Liberty |
| 7,451,549 B1 | 11/2008 | Sodhi et al. |
| 7,647,185 B2 | 1/2010 | Tarassenko et al. |
| 7,815,508 B2 | 10/2010 | Dohta |
| 7,844,415 B1 | 11/2010 | Bryant et al. |
| 7,940,986 B2 | 5/2011 | Mekenkamp et al. |
| 7,978,178 B2 | 7/2011 | Pehlivan et al. |
| 8,184,100 B2 | 5/2012 | Lian et al. |
| 8,201,200 B2 | 6/2012 | Imai |
| 8,223,121 B2 | 7/2012 | Shaw et al. |
| 8,515,707 B2 | 8/2013 | Joseph et al. |
| 8,576,169 B2 | 11/2013 | Shaw et al. |
| 8,587,519 B2 | 11/2013 | Shaw et al. |
| 8,907,893 B2 | 12/2014 | Shaw et al. |
| 8,957,909 B2 | 2/2015 | Joseph et al. |
| 2002/0120217 A1 | 8/2002 | Adapathya et al. |
| 2002/0158815 A1 | 10/2002 | Zwern |
| 2002/0169553 A1* | 11/2002 | Perlmutter et al. ........... 701/214 |
| 2003/0018430 A1 | 1/2003 | Ladetto et al. |
| 2003/0023192 A1 | 1/2003 | Foxlin |
| 2003/0107888 A1 | 6/2003 | Devlin et al. |
| 2003/0149907 A1 | 8/2003 | Singh et al. |
| 2003/0164739 A1 | 9/2003 | Bae |
| 2004/0198463 A1 | 10/2004 | Knoedgen |
| 2004/0199674 A1 | 10/2004 | Brinkhus |
| 2005/0229117 A1 | 10/2005 | Hullender et al. |
| 2006/0033716 A1 | 2/2006 | Rosenberg et al. |
| 2006/0164384 A1 | 7/2006 | Smith et al. |
| 2006/0164386 A1 | 7/2006 | Smith et al. |
| 2006/0195254 A1 | 8/2006 | Ladetto et al. |
| 2006/0250358 A1 | 11/2006 | Wroblewski |
| 2007/0146319 A1 | 6/2007 | Masselle et al. |
| 2007/0234779 A1 | 10/2007 | Hsu et al. |
| 2007/0287911 A1 | 12/2007 | Haid et al. |
| 2008/0072234 A1 | 3/2008 | Myroup |
| 2008/0080789 A1 | 4/2008 | Marks et al. |
| 2008/0150891 A1 | 6/2008 | Berkley et al. |
| 2008/0211768 A1 | 9/2008 | Breen et al. |
| 2008/0281555 A1 | 11/2008 | Godin et al. |
| 2008/0284729 A1 | 11/2008 | Kurtenbach et al. |
| 2009/0009471 A1 | 1/2009 | Yamamoto et al. |
| 2009/0040175 A1 | 2/2009 | Xu et al. |
| 2009/0048021 A1 | 2/2009 | Lian et al. |
| 2009/0153349 A1 | 6/2009 | Lin et al. |
| 2009/0295722 A1 | 12/2009 | Yamamoto |
| 2009/0326857 A1 | 12/2009 | Mathews et al. |
| 2010/0039381 A1 | 2/2010 | Cretella, Jr. et al. |
| 2010/0060573 A1 | 3/2010 | Moussavi |
| 2010/0088061 A1* | 4/2010 | Horodezky et al. ........... 702/141 |
| 2010/0095773 A1 | 4/2010 | Shaw et al. |
| 2010/0097316 A1 | 4/2010 | Shaw et al. |
| 2010/0110001 A1 | 5/2010 | Yamamoto |
| 2010/0123605 A1 | 5/2010 | Wilson |
| 2010/0123656 A1 | 5/2010 | Park et al. |
| 2010/0149341 A1 | 6/2010 | Marks et al. |
| 2010/0150404 A1 | 6/2010 | Marks et al. |
| 2010/0156786 A1 | 6/2010 | Kabasawa et al. |
| 2010/0157168 A1 | 6/2010 | Dunton et al. |
| 2010/0174506 A1* | 7/2010 | Joseph et al. ................. 702/141 |
| 2010/0194879 A1 | 8/2010 | Pasveer et al. |
| 2010/0302145 A1 | 12/2010 | Langridge et al. |
| 2011/0163947 A1 | 7/2011 | Shaw et al. |
| 2011/0205156 A1 | 8/2011 | Gomez et al. |
| 2011/0239026 A1 | 9/2011 | Kulik |
| 2011/0241656 A1 | 10/2011 | Piemonte et al. |
| 2011/0242361 A1 | 10/2011 | Kuwahara et al. |
| 2012/0007713 A1 | 1/2012 | Nasiri et al. |
| 2012/0086725 A1 | 4/2012 | Joseph et al. |
| 2013/0174636 A1 | 7/2013 | Joseph |
| 2013/0179108 A1 | 7/2013 | Joseph et al. |
| 2014/0055351 A1 | 2/2014 | Shaw et al. |
| 2014/0139432 A1 | 5/2014 | Shaw et al. |

FOREIGN PATENT DOCUMENTS

| | | |
|---|---|---|
| EP | 2485119 | 8/2012 |
| EP | 2579127 | 4/2013 |
| WO | WO2004047011 | 6/2004 |
| WO | WO2005040991 | 5/2005 |
| WO | WO2005108119 | 11/2005 |
| WO | WO2006054295 | 5/2006 |
| WO | WO2006090197 | 8/2006 |
| WO | WO2009093161 | 7/2009 |
| WO | WO2009132920 | 11/2009 |
| WO | WO2009156499 | 12/2009 |
| WO | WO2010048000 | 4/2010 |
| WO | WO2010080383 | 7/2010 |
| WO | WO2011085017 | 7/2011 |
| WO | WO2011109229 | 9/2011 |
| WO | WO2012047494 | 4/2012 |
| WO | WO2013104006 | 7/2013 |
| WO | WO2013148585 | 10/2013 |

OTHER PUBLICATIONS

Ang, We Tech, et al., "Kalman Filtering for Real-Time Orientation Tracking of Handheld Microsurgical Instrument," Proceedings of 2004 IEEE/RSJ International Conference on Intelligent Robtos and Systems; Sep. 28-Oct. 2, 2004; Sendai, Japan pp. 2574-2580.

International Search Report and Written Opinion for International Application No. PCT/US2009/060475 mailed May 18, 2010, 9 pages.

International Search Report and Written Opinion for International Application No. PCT/US2009/067976 mailed May 3, 2010, 9 pages.

Simon, D., "Kalman Filtering" Embedded Systems Programming, Jun. 2001, 8 pages.

International Search Report and Written Opinion for Internatioanl Application No. PCT/US2011/020242 mailed Apr. 12, 2011, 13 pages.

International Search Report and Written Opinion for International Application No. PCT/US2011/052185 mailed Jan. 31, 2012, 11 pages.

Foxlin, "Intertial Head-Tracker Sensor Fusion by a Complementary Separate-Bias Filter," 1996, IEEE pp. 185-195.

(56) References Cited

OTHER PUBLICATIONS

Foxlin et al., "Miniature 6-DOF Inertial System for Tracking HMDs," SPIE vol. 3362, Helmet and Head-Mounted Displays, III, AeroSense 98, Orlando, FL, Apr. 13-14, 1998 pp. 1-15.

International Search Report and Written Opinion for International Application No. PCT/US2012/020365 mailed May 23, 2012, 10 pages.

Sedlak, Joseph E. "Spinning Spacecraft Attitude Estimation Using Markley Variables: Filter Implementation and Results" NASA Goddard Space Flight Center CP-2005-212789, Greenbelt, MD (2005), pp. 1-15.

Luong-Van, D. et al. "Covariance Profiling for an Adaptive Kalman Filter to Suppress Sensor Quantization Effects" 43rd IEEE Conference on Decision and Control, vol. 3, pp. 2680- 2685, Dec. 14-17, 2004.

* cited by examiner

500

502 — Generate, at a processing apparatus, navigational state estimates for a device having a plurality of sensors. The plurality of sensors include a magnetometer. The processing apparatus has a plurality of modes of operation including:

A magnetometer-assisted mode of operation in which measurements from the magnetometer are used to estimate the navigational state of the device.

An alternate mode of operation in which measurements from a subset of sensors of the plurality of sensors that does not include the magnetometer are used to estimate the navigational state of the device.

504 — A Kalman filter is used to estimate the navigational state of the device in accordance with measurements from sensors in the plurality of sensors. The Kalman filter includes a magnetic field residual term corresponding to a difference between the estimated magnetic field and the measured magnetic field

506 — While operating in the magnetometer-assisted mode of operation:

Calculate a first value of the magnetic field residual.

Use the first value of the magnetic field residual to estimate the navigational state of the device.

508 — While operating in the alternate mode of operation:

Calculate a second value of the magnetic field residual.

Forgo use of the second value of the magnetic field residual to estimate the navigational state of the device.

510 — Forgoing use of a value of the magnetic field residual to estimate the navigational state of the device includes setting a gain of the magnetic field residual to zero in the Kalman filter (A)

Figure 5A

SYSTEM AND METHOD FOR DETERMINING A UNIFORM EXTERNAL MAGNETIC FIELD

RELATED APPLICATIONS

This application claims priority to U.S. Provisional Application Ser. No. 61/615,327, filed Mar. 25, 2012, which application is incorporated by reference herein in its entirety.

TECHNICAL FIELD

The disclosed embodiments relate generally to determining a navigational state of a navigation sensing device.

BACKGROUND

A navigation sensing device detects changes in navigational state of the device using one or more sensors. In some situations sensor measurements from multiple sensors are combined to determine a navigational state of the sensing device. The navigational state of the device can be used for many different purposes, including controlling a user interface (e.g., moving a mouse cursor) and tracking movements of the navigation sensing device over time.

SUMMARY

However, in situations where sensor measurements from multiple sensors are combined to determine the navigational state (e.g., attitude and position) of the navigation sensing device, the inaccuracy of one of the sensors can distort the navigational state even when other sensors are accurate. For example a non-uniform disturbance in a local magnetic field (e.g., caused by electrical wiring or proximity to a large metallic object) will degrade the performance of a magnetometer but will not affect an accelerometer or a gyroscope. Thus, ceasing to use sensor measurements from the magnetometer to determine the navigational state of the device when a magnetic disturbance is detected will improve the navigational state estimate by reducing or eliminating the effect of the magnetic disturbance on the navigational state estimate. However, an accelerometer and/or gyroscope measurements are prone to drift (e.g., accumulated error in the estimate of the navigational state). Using sensor measurements from a magnetometer helps prevent navigational state drift in situations where the reference magnetic field (e.g., the Earth's magnetic field) is locally constant.

Thus, in many situations is advantageous to resume using sensor measurements from the magnetometer to estimate the navigational state of the device after the local magnetic disturbance has ended (e.g., because the disturbance has ceased or because the device has been moved out of range of the disturbance). However, reintroducing the use of magnetometer measurements while the uncompensated magnetic disturbance is still present will distort the navigational state estimate. Accordingly, it would be desirable to be able to determine whether the uncompensated magnetic disturbance is still present. However various problems can complicate the determination as to whether the uncompensated magnetic disturbance is still present, including the possibility that while the magnetometer was not in use, the navigational state estimate drifted so that the device continues to register an uncompensated magnetic disturbance even after the uncompensated magnetic disturbance has ceased. As such, it would be advantageous to cease using measurements from a magnetometer to generate navigational state estimates in the presence of an uncompensated magnetic disturbance and intelligently determine whether or not to resume using measurements from a magnetometer to generate navigational state estimates for a device.

Some embodiments provide a method for, at a processing apparatus having one or more processors and memory storing one or more programs that when executed by the one or more processors cause the respective processing apparatus to perform the method. The method includes generating navigational state estimates for a device having a plurality of sensors. The plurality of sensors including a magnetometer. The processing apparatus has a plurality of modes of operation including: a magnetometer-assisted mode of operation in which measurements from the magnetometer are used to estimate the navigational state of the device and an alternate mode of operation in which measurements from a subset of sensors of the plurality of sensors that does not include the magnetometer are used to estimate the navigational state of the device. The method further includes, for a respective time period, operating in the alternate mode of operation and during the respective time period collecting a plurality of magnetometer measurements and determining whether the plurality of magnetometer measurements meet predefined measurement-consistency requirements. The method also includes, in accordance with a determination that the plurality of magnetometer measurements meet predefined measurement-consistency requirements, transitioning to the magnetometer-assisted mode of operation and in accordance with a determination that the plurality of magnetometer measurements do not meet predefined measurement-consistency requirements, continuing to operate in the alternate mode of operation.

In accordance with some embodiments, a computer system (e.g., a navigation sensing device or a host computer system) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium (e.g., for use by a navigation sensing device or a host computer system) has stored therein instructions which when executed by one or more processors, cause a computer system (e.g., a navigation sensing device or a host computer system) to perform the operations of any of the methods described above.

BRIEF DESCRIPTION OF THE DRAWINGS

FIGS. 5A-5D are flow diagrams of a method for determining estimated navigational states of a navigation sensing device, according to some embodiments.

DESCRIPTION OF EMBODIMENTS

Exemplary Use Cases

Navigation sensing devices (e.g., human interface devices or motion tracking device) that have a determinable multi-dimensional navigational state (e.g., one or more dimensions of displacement and/or one or more dimensions of rotation or attitude) are becoming increasingly common for providing input for many different applications. For example, such a navigation sensing device may be used as a multi-dimensional pointer to control a pointer (e.g., a cursor) on a display of a personal computer, television, gaming system, etc. As another example, such a navigation sensing device may be used to provide augmented reality views (e.g., by overlaying computer generated elements over a display of a view of the real world) that change in accordance with the navigational state of the navigation sensing device so as to match up with a view of the real world that is detected on a camera attached to the navigation sensing device. As yet another example, such a navigation sensing device may be used to provide views of a virtual world (e.g., views of portions of a video game, computer generated simulation, etc.) that change in accordance with the navigational state of the navigation sensing device so as to match up with a virtual viewpoint of the user based on the orientation of the device. In other situations a navigation sensing device may be used as a motion tracking device to track changes in position and/or orientation of the device over time. These tracked changes can be used to map movements and/or provide other navigational state dependent services (e.g., location or orientation based alerts, etc.). In this document, the terms orientation, attitude and rotation are used interchangeably to refer to the orientation of a device or object with respect to a frame of reference.

In order to function properly (e.g., return results to the user that correspond to movements of the navigation sensing device in predictable ways), these applications rely on sensors that determine accurate estimates of the navigational state of the device. While specific use cases are described above and will be used to illustrate the general concepts described herein, it should be understood that these examples are non-limiting examples and that the embodiments described herein would apply in an analogous manner to any navigation sensing device that would benefit from an accurate estimate of the navigational state of the device.

System Overview

Figure 1:
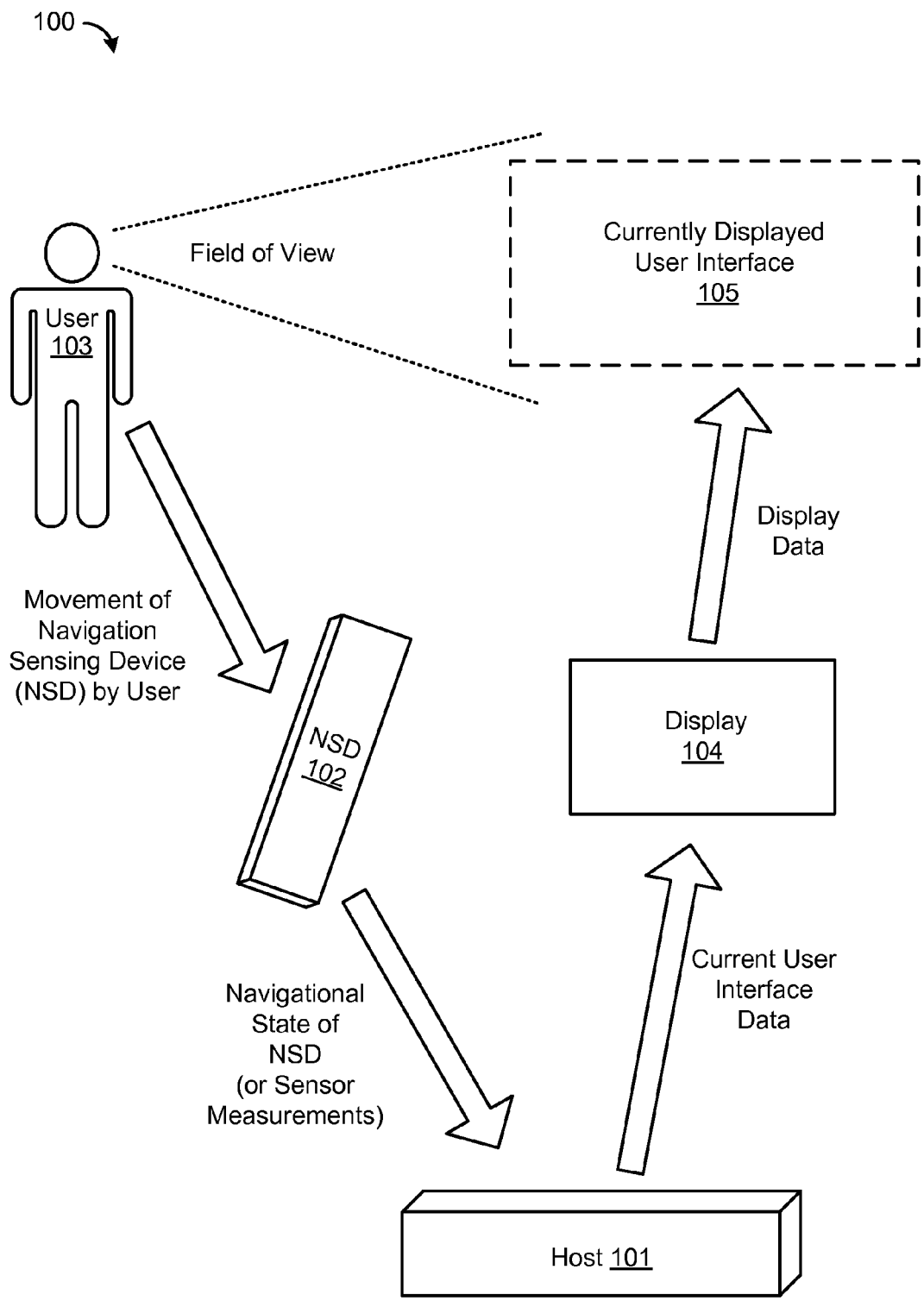
FIG. 1 illustrates a system for using a navigation sensing device, according to some embodiments.

Attention is now directed to FIG. 1, which illustrates an example system 100 for using a navigation sensing device (e.g., a human interface device such as a multi-dimensional pointer) to manipulate a user interface. As shown in FIG. 1, an example Navigation Sensing Device 102 (hereinafter "Device 102") is coupled to a Host Computer System 101 (hereinafter "Host 101") through a wireless interface, according to some embodiments. In these embodiments, a User 103 moves Device 102. These movements are detected by sensors in Device 102, as described in greater detail below with reference to FIG. 2. Device 102, or Host 101, generates a navigational state of Device 102 based on sensor measurements from the sensors and transmits the navigational state to Host 101. Alternatively, Device 102 generates sensor measurements and transmits the sensor measurements to Host 101, for use in estimating a navigational state of Device 102. Host 101 generates current user interface data based on the navigational state of Device 102 and transmits the current user interface data to Display 104 (e.g., a display or a projector), which generates display data that is displayed to the user as the currently displayed User Interface 105. While Device 102, Host 101 and Display 104 are shown in FIG. 1 as being separate, in some embodiments the functions of one or more of these elements are combined or rearranged, as described in greater detail below with reference to FIGS. 3A-3E.

Thus, the user can use Device 102 to issue commands for modifying the user interface, control objects in the user interface, and/or position objects in the user interface by moving Device 102 so as to change its navigational state. In some embodiments, Device 102 is sensitive to six degrees of freedom: displacement along the x-axis, displacement along the y-axis, displacement along the z-axis, yaw, pitch, and roll.

In some other situations, Device 102 is a navigational state tracking device (e.g., a motion tracking device) that tracks changes in the navigational state of Device 102 over time but does not use these changes to directly update a user interface that is displayed to the user. For example, the updates in the navigational state can be recorded for later use by the user or transmitted to another user or can be used to track movement of the device and provide feedback to the user concerning their movement (e.g., directions to a particular location near the user based on an estimated location of the user). When used to track movements of a user without relying on external location information (e.g., Global Positioning System signals), such motion tracking devices are also sometimes referred to as pedestrian dead reckoning devices.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces. In some embodiments, the wireless interface is a unidirectional wireless interface from Device 102 to Host 101. In some embodiments, the wireless interface is a bidirectional wireless interface. In some embodiments, bidirectional communication is used to perform handshaking and pairing operations. In some embodiments, a wired interface is used instead of or in addition to a wireless interface. As with the wireless interface, the wired interface may be a unidirectional or bidirectional wired interface.

In some embodiments, data corresponding to a navigational state of Device 102 (e.g., raw measurements, calculated attitude, correction factors, position information, etc.) is transmitted from Device 102 and received and processed on Host 101 (e.g., by a host side device driver). Host 101 uses this data to generate current user interface data (e.g., specifying a position of a cursor and/or other objects in a user interface) or tracking information.

Figure 2:
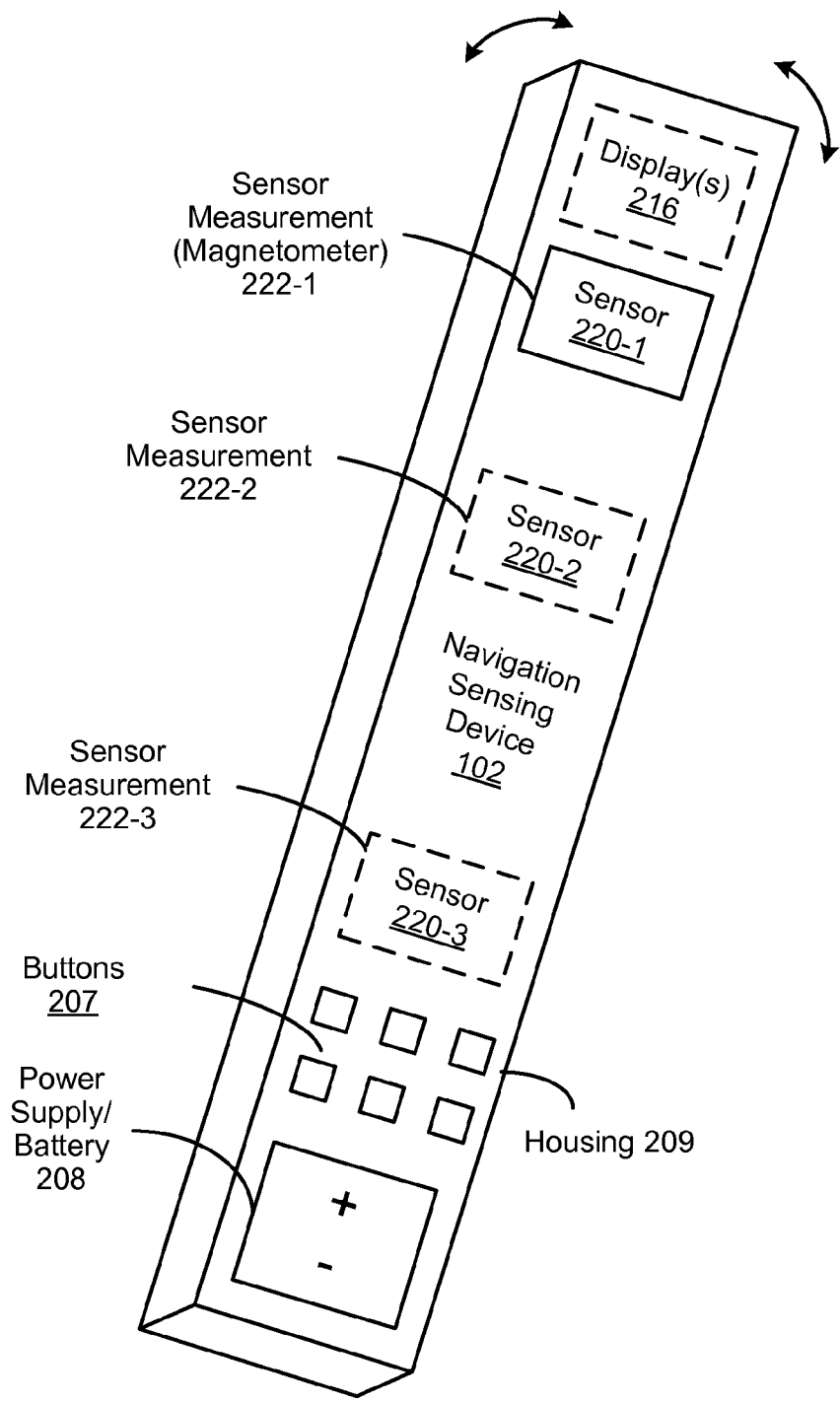
FIG. 2 is a block diagram illustrating an example navigation sensing device, according to some embodiments.

Attention is now directed to FIG. 2, which illustrates an example of Device 102, according to some embodiments. In accordance with some embodiments, Device 102 includes one or more Sensors 220 which produce corresponding sensor outputs, which can be used to determine a navigational state of Device 102. For example, in one implementation, Sensor 220-1 is a multi-dimensional magnetometer generating multi-dimensional magnetometer measurements (e.g., a rotation measurement), Sensor 220-2 is a multi-dimensional accelerometer generating multi-dimensional accelerometer measurements (e.g., a rotation and translation measurement), and Sensor 220-3 is a gyroscope generating measurements (e.g., either a rotational vector measurement or rotational rate vector measurement) corresponding to changes in orientation of the device. In some implementations Sensors 220 include one or more of gyroscopes, beacon sensors, inertial measurement units, temperature sensors, barometers, proximity sensors, single-dimensional accelerometers and multi-dimensional accelerometers instead of or in addition to the multi-dimensional magnetometer and multi-dimensional accelerometer and gyroscope described above.

In some embodiments, Device 102 also includes one or more of: Buttons 207, Power Supply/Battery 208, Camera (not shown in the example in FIG. 2; see "camera(s)" 1180 in FIG. 6) and/or Display 216 (e.g., a display or projector). In some embodiments, Device 102 also includes one or more of the following additional user interface components: one or more processors, memory, a keypad, one or more thumb wheels, one or more light-emitting diodes (LEDs), an audio speaker, an audio microphone, a liquid crystal display (LCD), etc. In some embodiments, the various components of Device 102 (e.g., Sensors 220, Buttons 207, Power Supply 208, Camera (not shown in FIG. 2), and Display 216) are all enclosed in Housing 209 of Device 102. However, in implementations where Device 102 is a pedestrian dead reckoning device, many of these features are not necessary, and Device 102 can use Sensors 220 to generate tracking information corresponding changes in navigational state of Device 102 and transmit the tracking information to Host 101 wirelessly or store the tracking information for later transmission (e.g., via a wired or wireless data connection) to Host 101.

In some embodiments, one or more processors (e.g., 1102, FIG. 6) of Device 102 perform one or more of the following operations: sampling Sensor Measurements 222, at a respective sampling rate, produced by Sensors 220; processing sampled data to determine displacement; transmitting displacement information to Host 101; monitoring the battery voltage and alerting Host 101 when the charge of Battery 208 is low; monitoring other user input devices (e.g., keypads, buttons, etc.), if any, on Device 102 and, as appropriate, transmitting information identifying user input device events (e.g., button presses) to Host 101; continuously or periodically running background processes to maintain or update calibration of Sensors 220; providing feedback to the user as needed on the remote (e.g., via LEDs, etc.); and recognizing gestures performed by user movement of Device 102.

Attention is now directed to FIGS. 3A-3E, which illustrate configurations of various components of the system for generating navigational state estimates for a navigation sensing device. In some embodiments, there are three fundamental components to the system for determining a navigational state of a navigation sensing device described herein: Sensors 220, which provide sensor measurements that are used to determine a navigational state of Device 102, Measurement Processing Module 322 (e.g., a processing apparatus including one or more processors and memory) which uses the sensor measurements generated by one or more of Sensors 220 to generate estimates of the navigational state of Device 102 which can be used to determine current user interface data and/or track movement of Device 102 over time, and, optionally, Display 104, which displays the currently displayed user interface to the user of Device 102 and/or information corresponding to movement of Device 102 over time. It should be understood that these components can be distributed among any number of different devices.

In some embodiments, Measurement Processing Module 322 (e.g., a processing apparatus including one or more processors and memory) is a component of the device including Sensors 220. In some embodiments, Measurement Processing Module 322 (e.g., a processing apparatus including one or more processors and memory) is a component of a computer system that is distinct from the device including Sensors 220.

In some embodiments a first portion of the functions of Measurement Processing Module 322 are performed by a first device (e.g., raw sensor data is converted into processed sensor data at Device 102) and a second portion of the functions of Measurement Processing Module 322 are performed by a second device (e.g., processed sensor data is used to generate a navigational state estimate for Device 102 at Host 101).

Figure 3A:
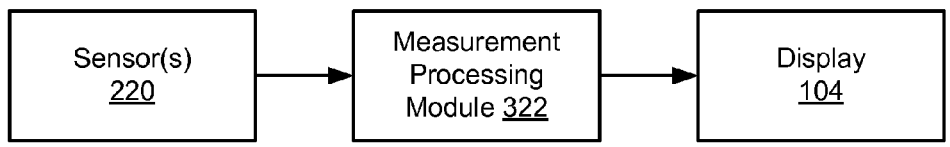
FIGS. 3A-3E are block diagrams illustrating configurations of various components of the system including a navigation sensing device, according to some embodiments.
Figure 3B:
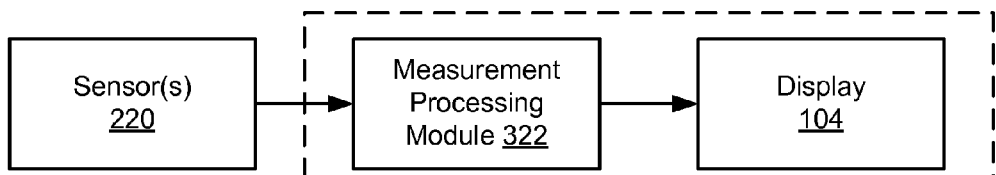
Figure 3C:
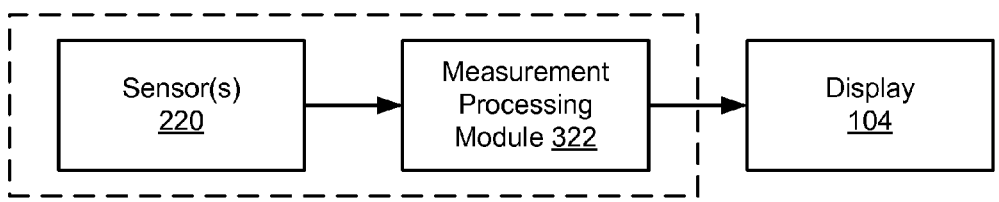

As one example, in FIG. 3A, Sensors 220, Measurement Processing Module 322 and Display 104 are distributed between three different devices (e.g., a navigation sensing device such as a multi-dimensional pointer, a set top box, and a television, respectively; or a motion tracking device, a back-end motion processing server and a motion tracking client). As another example, in FIG. 3B, Sensors 220 are included in a first device (e.g., a multi-dimensional pointer or a pedestrian dead reckoning device), while the Measurement Processing Module 322 and Display 104 are included in a second device (e.g., a host with an integrated display). As another example, in FIG. 3C, Sensors 220 and Measurement Processing Module 322 are included in a first device, while Display 104 is included in a second device (e.g., a "smart" multi-dimensional pointer and a television respectively; or a motion tracking device and a display for displaying information corresponding to changes in the movement of the motion tracking device over time, respectively).

Figure 3D:
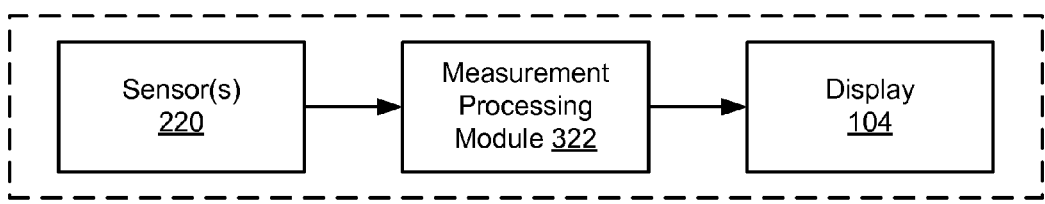
Figure 3E:
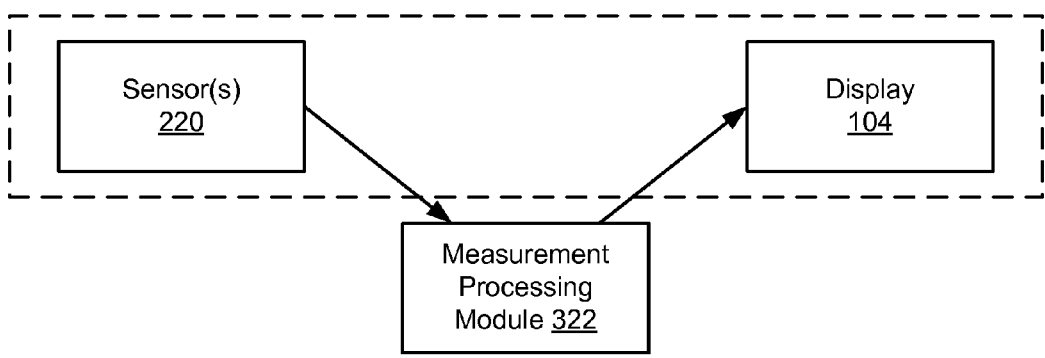

As yet another example, in FIG. 3D, Sensors 220, Measurement Processing Module 322 and Display 104 are included in a single device (e.g., a mobile computing device, such as a smart phone, personal digital assistant, tablet computer, etc., with an augmented reality application). As a final example, in FIG. 3E, Sensors 220 and Display 104 are included in a first device (e.g., a game controller with a display/projector), while Measurement Processing Module 322 is included in a second device (e.g., a game console/server). It should be understood that in the example shown in FIG. 3E, the first device will typically be a portable device (e.g., a smartphone or a pointing device) with limited processing power, while the second device is a device (e.g., a host computer system) with the capability to perform more complex processing operations, or to perform processing operations at greater speed, and thus the computationally intensive calculations are offloaded from the portable device to a host device with greater processing power. While a plurality of common examples have been described above, it should be understood that the embodiments described herein are not limited to the examples described above, and other distributions of the various components could be made without departing from the scope of the described embodiments.

Using Multiple Sensors to Estimate Navigational States

In some implementations measurements from multiple sensors are used to estimate navigational states of Device 102 (e.g., via sensor fusion). For example, one combination of sensors that provide measurements that can be used to estimate navigational state (e.g., orientation and/or position) includes a gyroscope, one or more accelerometers, and one or more magnetometers. This navigational state data is used by other processes, such as pedestrian dead reckoning which uses changes in the navigational state over time to determine movement of Device 102.

Sometimes, sensor measurements from a respective sensor cannot be trusted because the sensor measurements differs too much from the expected model of sensor behavior for the respective sensor. For example, in many situations it is difficult or impossible to model translational acceleration for an accelerometer, and under the condition that there is translational acceleration present, sensor measurements from the accelerometer cannot be trusted (e.g., using these sensor measurements will result in introducing errors into the estimated navigational state).

Likewise, for the magnetometer, the expected model of sensor behavior for the magnetometer assumes that the local external magnetic field is uniform. If this assumption is violated (e.g., due to a local magnetic disturbance) the magnetometer measurements will be inaccurate and consequently the navigational state estimate and the other processes that depend on the navigational state estimate will be degraded. More specifically, the estimated navigational state will include erroneous gyroscope biases and/or erroneous headings angles (e.g., in the case of pedestrian dead reckoning). Therefore, it is beneficial to detect any uncompensated disturbances (e.g., a non-uniform disturbances in the magnetic field) and then to take steps to mitigate the effect of the resulting inaccuracies in magnetometer measurements on navigational state estimates for Device 102.

In this situation, the computer system switches to an alternative mode of operation (sometimes called "magnetic anomaly mode"), in which the effect of the sensor measurements from the magnetometer on the navigational state estimate is reduced. In the alternate mode of operation a gyroscope and/or one or more accelerometers are used to update navigational state estimates for Device 102 by integrating changes in the acceleration or angular rotation to determine movement of Device 102. In some embodiments, while the navigational state estimates for Device 102 are being generated in the alternate mode of operation, sensor measurements from the magnetometer are ignored altogether until the measurement model becomes accurate again (e.g., the non-uniform disturbance in the magnetic field is removed or ceases). In other embodiments, while the estimates navigational state estimates for Device 102 are being generated in the alternate mode of operation, the weight given to sensor measurements from the magnetometer is reduced until the measurement model becomes accurate again (e.g., the non-uniform disturbance in the magnetic field is removed).

Figure 4:
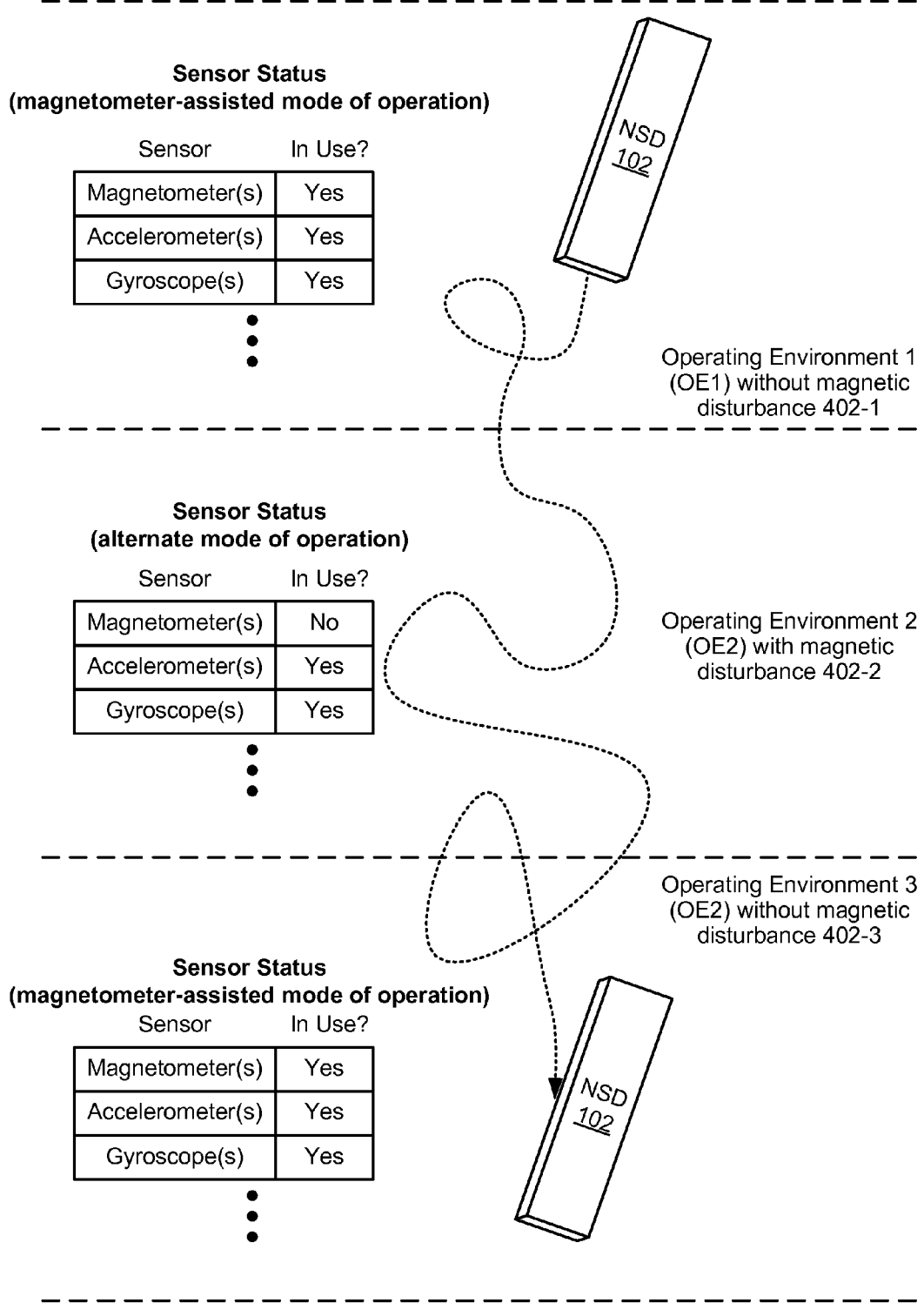
FIG. 4 is a diagram illustrating an example of switching between a magnetometer-assisted mode of operation and an alternate mode of operation, according to some embodiments.
Figure 5B:
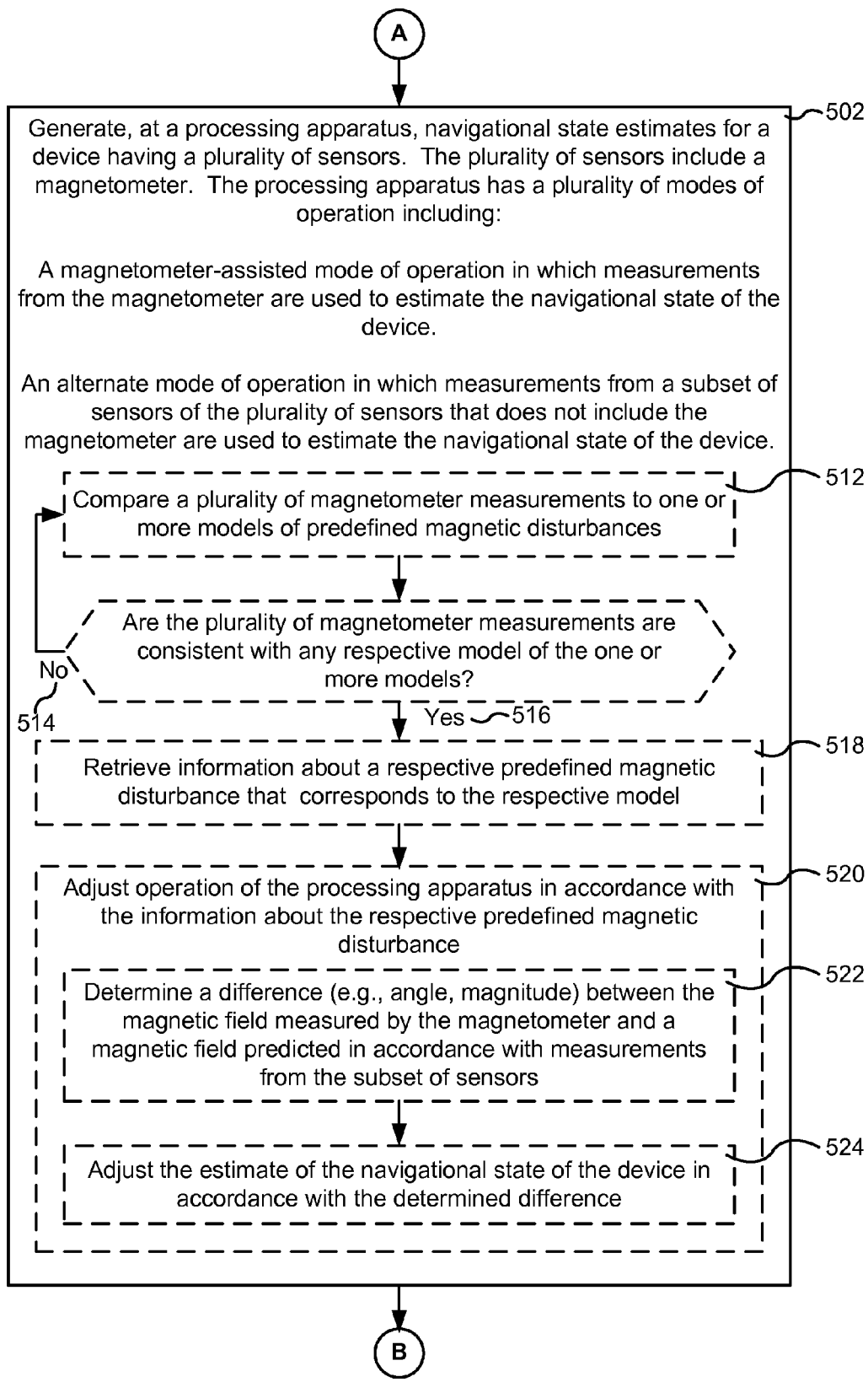
Figure 5C:
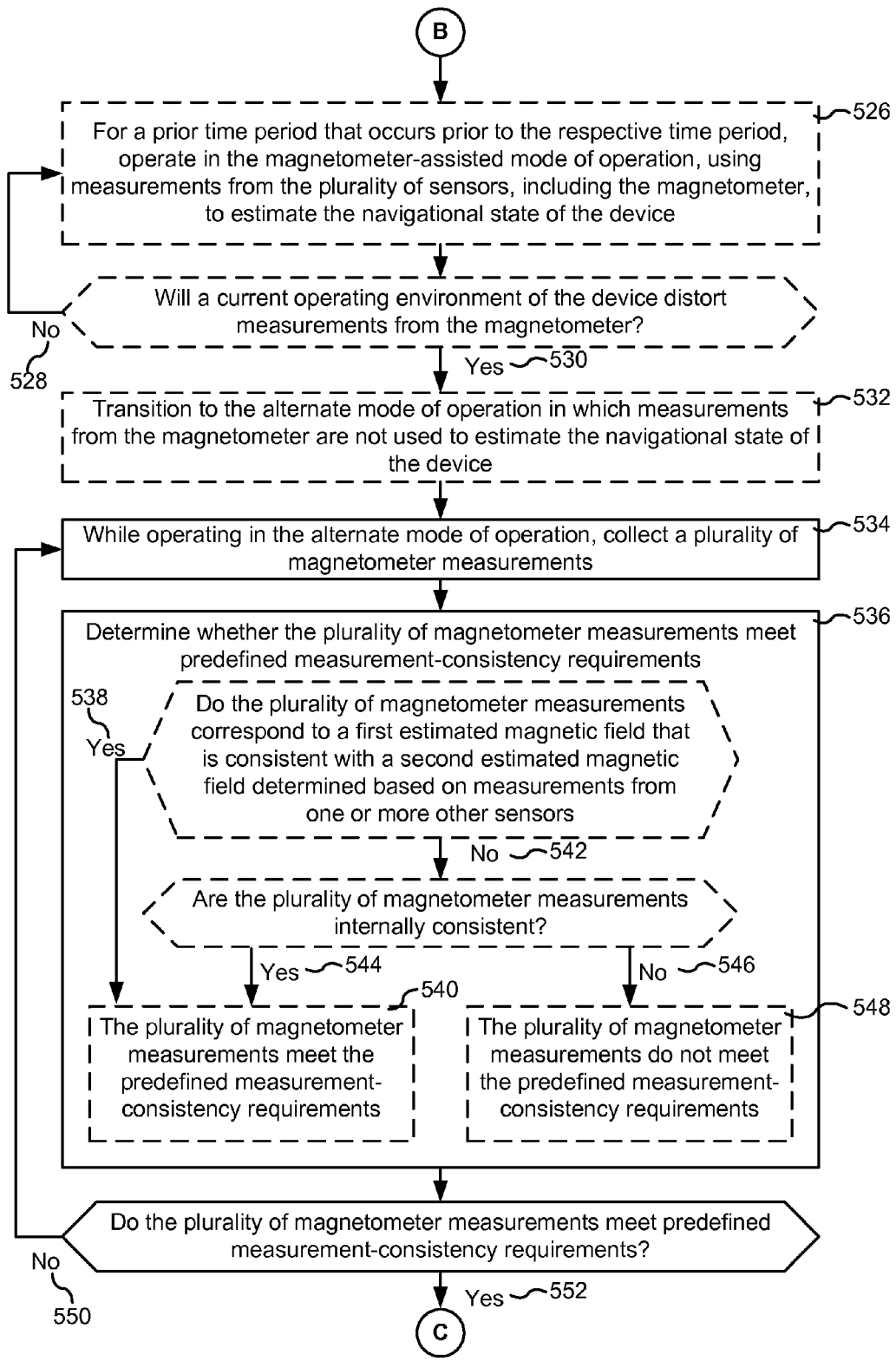
Figure 5D:
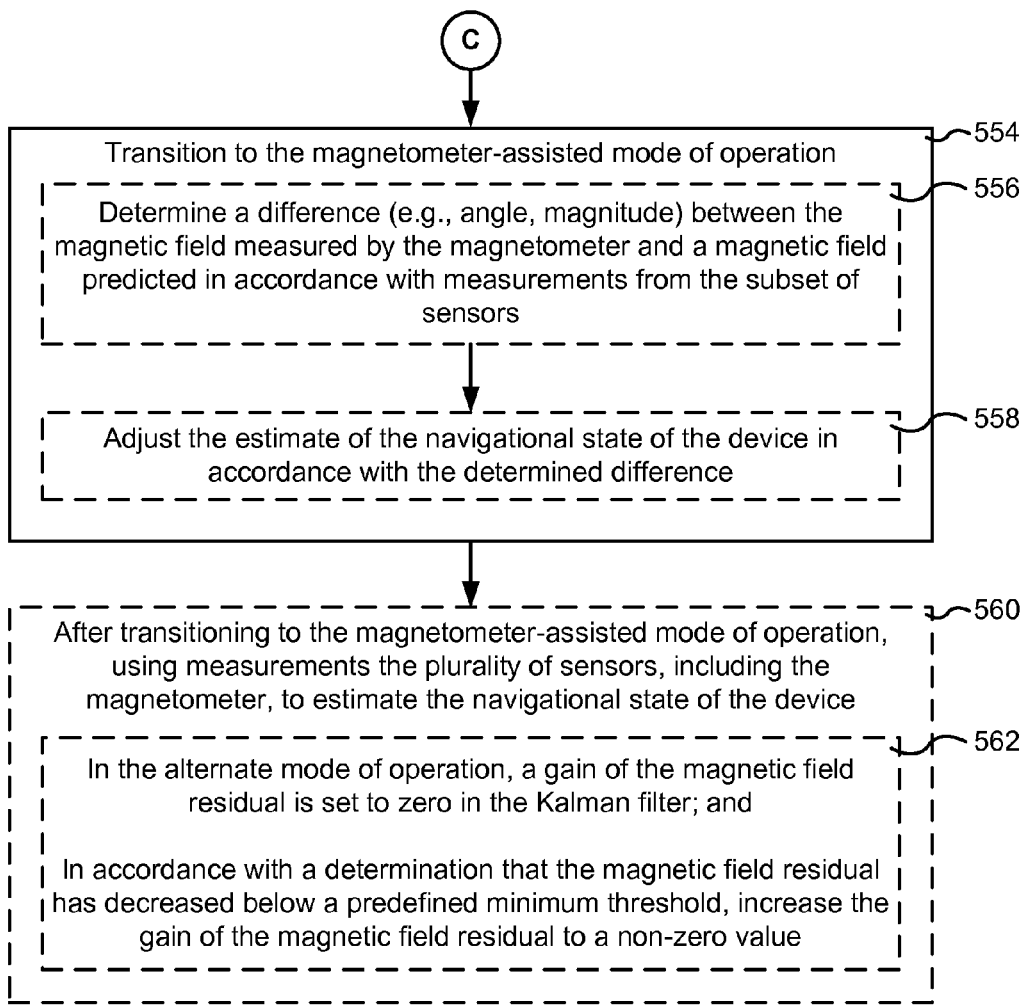

FIG. 4 illustrates an example of switching between a magnetometer-assisted mode of operation and an alternate mode of operation. Device 102 starts in a first operating environment, Operating Environment 1 (OE1) 402-1, which does not include a magnetic disturbance that substantially degrades performance of the magnetometer. While in the first operating environment, the magnetometer(s), accelerometer(s) and gyroscope(s) are used to update the navigational state of Device 102 by a processing apparatus operating in the magnetometer-assisted mode of operation. Subsequently, Device 102 moves from the first operating environment to a second operating environment, Operating Environment 2 (OE2) 402-2, which does include a magnetic disturbance that substantially degrades performance of the magnetometer (e.g., a non-uniform magnetic disturbance). For example Device 102 is placed on a large metal table or near a speakerphone or other electronic device that generates a strong magnetic field, the magnetic field near Device 102 will be distorted and produce magnetic field measurements that differ substantially from the reference magnetic field (e.g., the Earth's magnetic field). While in the second operating environment, the accelerometer(s) and gyroscope(s) are still used to update navigational state estimates for Device 102 by a processing apparatus operating in the alternate mode of operation where the magnetometer(s) are not used to updated the navigational state of Device 102. Subsequently, Device 102 moves from the second operating environment to a third operating environment, Operating Environment 3 (OE3) 402-3, which does not include a magnetic disturbance that substantially degrades performance of the magnetometer (e.g., a non-uniform magnetic disturbance). For example Device 102 is lifted off of the large metal table or moved away from the speakerphone or other electronic device that generates a strong magnetic field, so that the local magnetic field approximates the reference magnetic field (e.g., the Earth's magnetic field). While in the first operating environment, the magnetometer(s), accelerometer(s) and gyroscope(s) are used to update navigational state estimates for Device 102 by a processing apparatus operating in the magnetometer-assisted mode of operation (e.g., the processing apparatus returns to the magnetometer-assisted mode of operation).

In many situations when the non-uniform disturbance in the magnetic field is removed the measurement model will become accurate again (e.g., because the navigational state estimate has not drifted substantially from when the sensor measurements from the magnetometer ceased to be used to update the estimate of the navigational state). In these situations, the processing apparatus can transition from the alternate mode of operation to the magnetometer-assisted mode of operation when the measurement model becomes accurate again (e.g., the magnetic field measured by the magnetometer is in agreement with the magnetic field predicted based on measurements from the other sensors).

However, in other situations the estimate of the navigational state drifts while in the alternate mode of operation (e.g., because the navigation sensing device undergoes dynamic acceleration and/or the non-uniform disturbance in the magnetic field is present for too long a time). In these situations, the accumulation of attitude drift caused by integrating sensor measurements from the gyroscope and/or accelerometer(s) will cause the measurement model to always report too high an error to ever recover (e.g., return to a magnetometer-assisted mode of operation) and thus it is difficult to determine whether or not it is appropriate to transition from the alternate mode of operation to the magnetometer-assisted mode of operation. One possible approach to recovering from this situation where the magnetometer is not in use and the estimate of the navigational state has drifted, is to determine if the external field is uniform, even if the measurement model is not accurate, which indicates that the magnetometer is likely reliable but that the navigational state estimate drifted while in the alternate mode of operation.

Determination of external field uniformity is possible by attempting to estimate the magnetic field in the inertial frame ("$h_{ref}$") over a variety of diverse orientations. If the external magnetic field is uniform, then the estimate of the magnetic field in the inertial frame ("$h_{ref}$") should have a variance comparable to the sensor noise of the magnetometer. Once the estimate of the magnetic field in the inertial frame ("$h_{ref}$") has been generated, an attitude correction that will compensate for the drift in the navigational state estimate can be determined and used to reintroduce the sensor measurements from the magnetometer to the navigational state estimation process, thereby returning to the magnetometer-assisted mode of operation. An example of one set of steps for transitioning from the alternate mode of operation to the magnetometer-assisted mode of operation is described below:

(1) Collect N "diverse" magnetometer measurements. A magnetometer measurement $m_i$ is diverse from other measurements if $m_i^T < \beta \forall j \neq i$, where $\beta$ is a defined constant.

(2) Compute an estimate of the inertial frame magnetic field $h_{ref}$ from magnetometer measurements and the filters associated attitude estimates. (2a) Compute an inertial frame magnetic field direction for each magnetometer measurement: $h_{ref}^{(i)} = C^T(q^i)m_i/\|m_i\|$ where $q_i$ is the attitude quaternion estimate. (2b) Compute an estimate of the inertial magnetic field direction through the mean: $\hat{h}_{ref} = (1/N)\Sigma_i^N h_{ref}^{(i)}$.

(3) Check the uniformity of the estimated magnetic field. In a uniform field, the inertial frame magnetic field direction estimates for different magnetometer measurements should be consistent. In some embodiments, checking the uniformity of the estimated field includes checking the similarity of the individual estimates. The field is defined as uniform if $\sigma^2 < \alpha$, where $\sigma^2 = (1/N)\Sigma_i^N (1 - \hat{h}_{ref}^T h_{ref}^{(i)})$ and $\alpha$ is defined as a constant.

(4) If Device 102 is determined to be in a uniform field, apply attitude correction and resume normal operating mode. (4a) In the situation where the reference magnetic field is the Earth's magnetic field, the inertial frame magnetic field direction estimated from this algorithm should be corrected to have zero azimuth. (4b) Compute rotation matrix to transform estimated magnetic field into zero azimuth:

$$C = \begin{bmatrix} \hat{h}_{ref}(0) & \hat{h}_{ref}(1) & 0 \\ -\hat{h}_{ref}(1) & \hat{h}_{ref}(0) & 0 \\ 0 & 0 & 1 \end{bmatrix}.$$

(4c) Compute new magnetic field direction vector using above rotation matrix, and feed the new magnetic field direction vector back to the attitude filter: $h_{ref} = C\hat{h}_{ref}$. (4d) Compute an attitude correction associated with above azimuth correction to be applied to any previous attitude estimates $dq = f(C)$. This fixed attitude correction is used to correct for the attitude drift that occurred while the magnetometer was not being used to update navigational state estimates for Device 102.

Attention is now directed to FIGS. 5A-5D, which illustrate a method 500 for determining estimated navigational states of a navigation sensing device. Method 500 is, optionally, governed by instructions that are stored in a non-transitory computer readable storage medium and that are executed by one or more processors of one or more computer systems (e.g., Device 102, FIG. 6 or Host 101, FIG. 7). Each of the operations shown in FIGS. 5A-5D typically corresponds to instructions stored in a computer memory or non-transitory computer readable storage medium (e.g., Memory 1110 of Device 102 in FIG. 6 or Memory 1210 of Host 101 in FIG. 7). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 500 are combined and/or the order of some operations is changed from the order shown in FIGS. 5A-5D.

The following operations are performed at a processing apparatus having one or more processors and memory storing one or more programs that when executed by the one or more processors cause the respective processing apparatus to perform the method. In some embodiments, the processing apparatus is a component of Device 102 (e.g., the processing apparatus includes CPU(s) 1102 in FIG. 6). In some embodiments, the processing apparatus is separate from Device 102 (e.g., the processing apparatus includes CPU(s) 1202 in FIG. 7).

The processing apparatus generates (502) navigational state estimates for a device having a plurality of sensors, the plurality of sensors including a magnetometer. The processing apparatus has a plurality of modes of operation including: a magnetometer-assisted mode of operation in which measurements from the magnetometer are used to estimate the navigational state of Device 102 and an alternate mode of operation in which measurements from a subset of sensors of the plurality of sensors that does not include the magnetometer are used to estimate the navigational state of Device 102. In some embodiments, the magnetometer-assisted mode is also referred to as a first mode of operation, a primary mode of operation or a magnetometer-assisted navigation mode. In some embodiments, the alternate mode of operation is also referred to as a second mode, a secondary mode, or a distorted/non-uniform magnetic field compensation navigation mode.

In some embodiments, a Kalman filter is used (504) to estimate the navigational state of Device 102 in accordance with measurements from sensors in the plurality of sensors and the Kalman filter includes a magnetic field residual term corresponding to a difference between the estimated magnetic field and the measured magnetic field. In some embodiments, while operating in the magnetometer-assisted mode of operation, the processing apparatus calculates (506) a first value of the magnetic field residual and use the first value of the magnetic field residual to estimate the navigational state of Device 102. In other words, in the alternate mode of operation, the magnetometer is still on and generating sensor measurements, but the sensor measurements are not being used to update the navigational state and are, instead, being used to determine if and when the sensor measurements from the magnetometer can be reintroduced to the process of estimating the navigational state of Device 102 (e.g., determining when to transition from the alternate mode of operation to the magnetometer-assisted mode of operation).

In some embodiments, while operating in the alternate mode of operation, the processing apparatus calculates (508) a second value of the magnetic field residual and forgoes use of the second value of the magnetic field residual to estimate the navigational state of Device 102. In some embodiments, the magnetic field residual term continues to be calculated in the same manner without regard to whether or not the processing apparatus is operating in the magnetometer-assisted mode of operation or the alternate mode of operation. However in the alternate mode of operation the magnetic field residual term is not used in updating the estimated navigational state of Device 102, while in the magnetometer-assisted mode of operation, the magnetic field residual term is used to update the estimated navigational state of Device 102. An advantage of continuing to calculate the magnetic field residual term while operating in the alternate mode of operation is that the magnetic field residual term can be used to determine whether to switch back to the magnetometer-assisted mode of operation. In other words, in some situations the magnetic field residual term serves as a good proxy for determining whether a temporary magnetic disturbance has ended. In some embodiments, forgoing use of a value of the magnetic field residual (e.g., while operating in the alternate mode of operation) to estimate the navigational state of Device 102 includes setting (510) a gain of the magnetic field residual to zero in the Kalman filter.

In some embodiments, the processing apparatus compares (512) the plurality of magnetometer measurements to one or more models of predefined magnetic disturbances and determines whether the plurality of magnetometer measurements are consistent with a respective model of the one or more models. In accordance with a determination that the plurality of magnetometer measurements are not (514) consistent with a respective model of the one or more models, the processing apparatus continues to operate in a current mode of operation and waits before checking again to determine whether the magnetometer measurements are consistent with one of the models of magnetic disturbances. For example, if Device 102 is placed near a speakerphone on a conference table that Device 102 has not been placed near before, the processing apparatus will not have any model for the magnetic disturbance caused by that particular speakerphone on that particular table and thus will not be able to adjust operation of the processing apparatus based on previously stored information.

In contrast, in some embodiments, in accordance with a determination that the plurality of magnetometer measurements are (516) consistent with a respective model of the one or more models. In this situation, the processing apparatus retrieves (518) information about a respective predefined magnetic disturbance that corresponds to the respective model. After retrieving the information, the processing apparatus adjusts (520) operation of the processing apparatus in accordance with the information about the respective predefined magnetic disturbance. In some embodiments, adjusting operation of the processing apparatus includes determining (522) a difference (e.g., angle, magnitude) between the magnetic field measured by the magnetometer and a magnetic field predicted in accordance with measurements from the subset of sensors and adjusting (524) the estimate of the navigational state of Device 102 in accordance with the determined difference.

For example, if the processing apparatus determines that the plurality of magnetometer measurements indicate that Device 102 is operating while plugged in to a charger, or with a closed lid, different functionality of Device 102 could be enabled or disabled accordingly (e.g., a display could be turned off if a lid of the device is closed and turned on if the lid of the device is opened). In these examples, the magnetic disturbances caused by a closed lid or being plugged into a power charger can be modeled in advance and a predetermined compensation for the known disturbance can be generated, so that it can be retrieved by the processing apparatus when the known disturbance is detected. In some embodiments, the processing apparatus learns new magnetic disturbances and is able to generate new models for detecting and compensating for repeated magnetic disturbances, such as learning the characteristics of a magnetic disturbance caused by Device 102 being placed in a particular vehicle (e.g., a vehicle owned by a user of Device 102).

In some implementations, for a prior time period that occurs prior to the respective time period, the processing apparatus operates (526) in the magnetometer-assisted mode of operation, using measurements from the plurality of sensors, including the magnetometer, to estimate the navigational state of Device 102. During the prior time period, the processing apparatus determines whether a current operating environment of Device 102 will distort measurements from the magnetometer (e.g., the processing apparatus determines whether there is a non-uniform magnetic disturbance that would reduce the accuracy of sensor measurements from the magnetometer below a predefined threshold). In accordance with a determination that the current operating environment of Device 102 will not (528) distort measurements from the magnetometer, the processing apparatus continues to operate in the magnetometer-assisted mode of operation (e.g., because the magnetometer-assisted mode of operation provides navigational state estimates that do not accumulate drift over time, in contrast to navigational state estimates based on gyroscope and/or accelerometer measurements). In contrast, in accordance with a determination that the current operating environment of Device 102 will (530) distort measurements from the magnetometer, the processing apparatus transitions (532) to the alternate mode of operation in which measurements from the magnetometer are not used to estimate the navigational state of Device 102 (e.g., while Device 102 is in the current operating environment that includes the magnetic disturbance).

For a respective time period, the processing apparatus operates in the alternate mode of operation. During the respective time period, the processing apparatus collects (534) a plurality of magnetometer measurements and determines (536) whether the plurality of magnetometer measurements meet predefined measurement-consistency requirements. In other words, while the processing apparatus is in the alternate mode of operation, the processing apparatus collects sensor measurements that are to be used to determine whether or not it is safe to resume using sensor measurements from the magnetometer to estimate the navigational state of Device 102.

In some implementations, determining whether the plurality of magnetometer measurements meet predefined measurement-consistency requirements includes determining whether the magnetometer measurements are consistent with other sensor measurements (e.g., comparative consistency of the magnetometer measurements) and, if the magnetometer measurements are not consistent with other sensor measurements, determining whether the magnetometer measurements are consistent with other magnetometer measurements (e.g., internal consistency of the magnetometer measurements). However, in some embodiments the processing apparatus does not check for comparative consistency of the magnetometer measurements and/or does not check for internal consistency of the magnetometer measurements.

In some implementations the processing apparatus determines whether the plurality of magnetometer measurements correspond to a first estimated magnetic field that is consistent with a second estimated magnetic field determined based on measurements from one or more other sensors. In particular, while in the alternate mode of operation, the processing apparatus determines a first estimated direction of the external magnetic field based on the plurality of magnetometer measurements (e.g., an estimate of the local magnetic field based on a diverse set of magnetometer measurements). Additionally, while in the alternate mode of operation, the processing apparatus also determines a second estimated direction of the external magnetic field based on measurements from one or more of the other sensors (e.g., an integration of accelerometer and/or gyroscope measurements that indicate relative movement of Device 102 from a respective navigational state) and a predetermined relationship between an estimated orientation of Device 102 and the external magnetic field (e.g., a previously determined relationship between the respective navigational state and the reference magnetic field). After determining the first estimated direction and the second estimated direction, the processing apparatus compares the first estimated direction with the second estimated direction. As an example, the predetermined relationship is a relationship between the respective navigational state and the reference magnetic field determined prior to detecting the magnetic disturbance and transitioning to the alternate mode of operation. In this example, the measurements from the one or more sensors are measurements from an accelerometer and/or gyroscope that are integrated to determine changes to the navigational state of Device 102 since the predefined relationship was determined. By combining a relationship between the magnetic field and an initial navigational state with information indicating a difference between the initial navigational state and the current navigational state, a current relationship between the magnetic field and the current navigational state can be estimated (e.g., by assuming that no drift in the navigational state has occurred).

In some embodiments, in accordance with the determination that the first estimated magnetic field is (538) consistent with the second estimated magnetic field, the processing apparatus determines that the plurality of magnetometer measurements meet (540) the predefined measurement consistency requirements. In other words, the processing apparatus determines that there was a temporary disturbance in the external magnetic field, which has ended and whether the processing apparatus can safely (e.g., without reducing the accuracy of the navigational state estimate for Device 102) transition back to the magnetometer-assisted mode of operation, as described in greater detail below with reference to operations 554-562.

In contrast, in accordance with the determination that the first estimated magnetic field is not (542) consistent with the second estimated magnetic field, the processing apparatus determines whether the plurality of magnetometer measurements are internally consistent. In other words, the processing apparatus determines that the magnetic field is substantially uniform but that, due to the fact that the estimated navigational state of Device 102 has drifted, the estimate of the magnetic field generated based on the navigational state of Device 102 does not match the estimate of the magnetic field generated based on the magnetometer (e.g., because the magnetic disturbance had a long duration, which allowed an accelerometer or gyroscope determined navigational state to drift). In this situation it is unlikely that a comparative consistency determination will ever return a match (e.g., because it is statistically unlikely that a navigational state estimate of Device 102 based on the accelerometer and/or gyroscope measurements will drift back into alignment with the magnetic field). Thus, in some embodiments an internal consistency comparison is performed to determine whether the magnetometer measurements are consistent with each other.

In some embodiments, the internal consistency comparison determines whether the direction of the magnetometer measurements is consistent. In particular, the processing apparatus determines a set of estimated directions of an external magnetic field based on corresponding magnetometer measurements and the plurality of magnetometer measurements are determined to meet the predefined measurement-consistency requirements when the set of estimated directions have a statistical dispersion below a predefined dispersion threshold (e.g., a standard deviation below a predefined numerical threshold). In some embodiments, the plurality of magnetometer measurements are collected so as to have a statistical dispersion below the predefined dispersion threshold. For example, when Device 102 is in a particular orientation, a magnetometer measurement is not collected at the particular orientation of Device 102 if another magnetometer measurement has already been collected at a substantially similar orientation (e.g., an orientation within 10 or 15 degrees of the current orientation). Alternatively, in some implementations a large number of magnetometer measurements are collected and only a subset of the collected magnetometer measurements are used. For example, the subset of the collected magnetometer measurements can be selected so as to exclude one or more magnetometer measurements that do not add additional measurement diversity.

In some embodiments, the internal consistency comparison determines whether the magnitude of the magnetometer measurements is consistent. In particular, the processing apparatus determines a set of estimated magnitudes of an external magnetic field based on corresponding magnetometer measurements and the plurality of magnetometer measurements meet the predefined measurement-consistency requirements when the set of estimated magnitudes have a statistical dispersion below a predefined dispersion threshold. (e.g., a standard deviation below a predefined numerical threshold). In some embodiments, the plurality of magnetometer measurements are collected so as to have a statistical dispersion below the predefined dispersion threshold. For example, when Device 102 is in a particular orientation, a magnetometer measurement is not collected at the particular orientation of Device 102 if another magnetometer measurement has already been collected at a substantially similar orientation (e.g., an orientation within 10 or 15 degrees of the current orientation). Alternatively, in some implementations a large number of magnetometer measurements are collected and only a subset of the collected magnetometer measurements are used. For example, the subset of the collected magnetometer measurements can be selected so as to exclude one or more magnetometer measurements that do not add additional measurement diversity.

In accordance with a determination that the plurality of magnetometer measurements are (544) internally consistent, the processing apparatus determines that the plurality of magnetometer measurements meet (540) the predefined measurement consistency requirements and that the processing apparatus can safely (e.g., without reducing the accuracy of the navigational state estimate for Device 102) transition back to the magnetometer-assisted mode of operation, as described in greater detail below with reference to operations 554-562.

In accordance with a determination that the plurality of magnetometer measurements are not (546) internally consistent, the processing apparatus determines that the plurality of magnetometer measurements do not meet (548) the predefined measurement consistency requirements. In accordance with the determination that the plurality of magnetometer measurements do not meet (550) predefined measurement-consistency requirements, the processing apparatus continues to operate in the alternate mode of operation. Optionally, continuing to operate in the alternate mode of operation includes repeatedly determining whether it is safe to transition from the alternate mode of operation to the magnetometer-assisted mode of operation (e.g., at periodic intervals or in response to detecting a triggering condition such as when a local magnetic field in the proximity of the device changes).

In contrast, in accordance with a determination that the plurality of magnetometer measurements meet (552) predefined measurement-consistency requirements, the processing apparatus transitions (554) to the magnetometer-assisted mode of operation. In some embodiments, transitioning from the alternate mode of operation to the magnetometer-assisted mode of operation includes determining (556) a difference (e.g., angle, magnitude) between the magnetic field measured by the magnetometer and a magnetic field predicted in accordance with measurements from the subset of sensors. In these embodiments, after determining the difference between the measured magnetic field and the predicted magnetic field, the processing apparatus adjusts (558) the estimate of the navigational state of Device 102 in accordance with the determined difference (e.g., by computing a rotational matrix to transform the estimated magnetic field into zero azimuth).

In some implementations, after transitioning to the magnetometer-assisted mode of operation, the processing apparatus uses (560) measurements of the plurality of sensors, including the magnetometer, to estimate the navigational state of Device 102. In some embodiments, while the processing apparatus is in the alternate mode of operation, a gain of the magnetic field residual is set to zero in the Kalman filter and in accordance with a determination that the magnetic field residual has decreased below a predefined minimum threshold the processing apparatus increases (562) the gain of the magnetic field residual to a non-zero value. In other words, in some embodiments, the magnetic field residual is computed in both the magnetometer-assisted mode of operation and the alternate mode of operation but is used for different purposes in the two different modes of operation. For example, while in the magnetometer-assisted mode of operation the processing apparatus uses the magnetic field residual to update navigational state estimates for Device 102. In contrast, while in the alternate mode of operation the processing apparatus uses the magnetic field residual to determine whether or not to transition back to the magnetometer-assisted mode of operation. Moreover, removing the magnetic field residual and reintroducing the magnetic field residual from the navigational state estimation process (e.g., the Kalman filter) can be accomplished by adjusting a gain of the magnetic field residual term in the Kalman filter rather than by transitioning between two different Kalman filters.

It should be understood that the particular order in which the operations in FIGS. 5A-5D have been described are merely exemplary and are not intended to indicate that the described order is the only order in which the operations could be performed. One of ordinary skill in the art would recognize various ways to reorder the operations described herein.

System Structure

Figure 6:
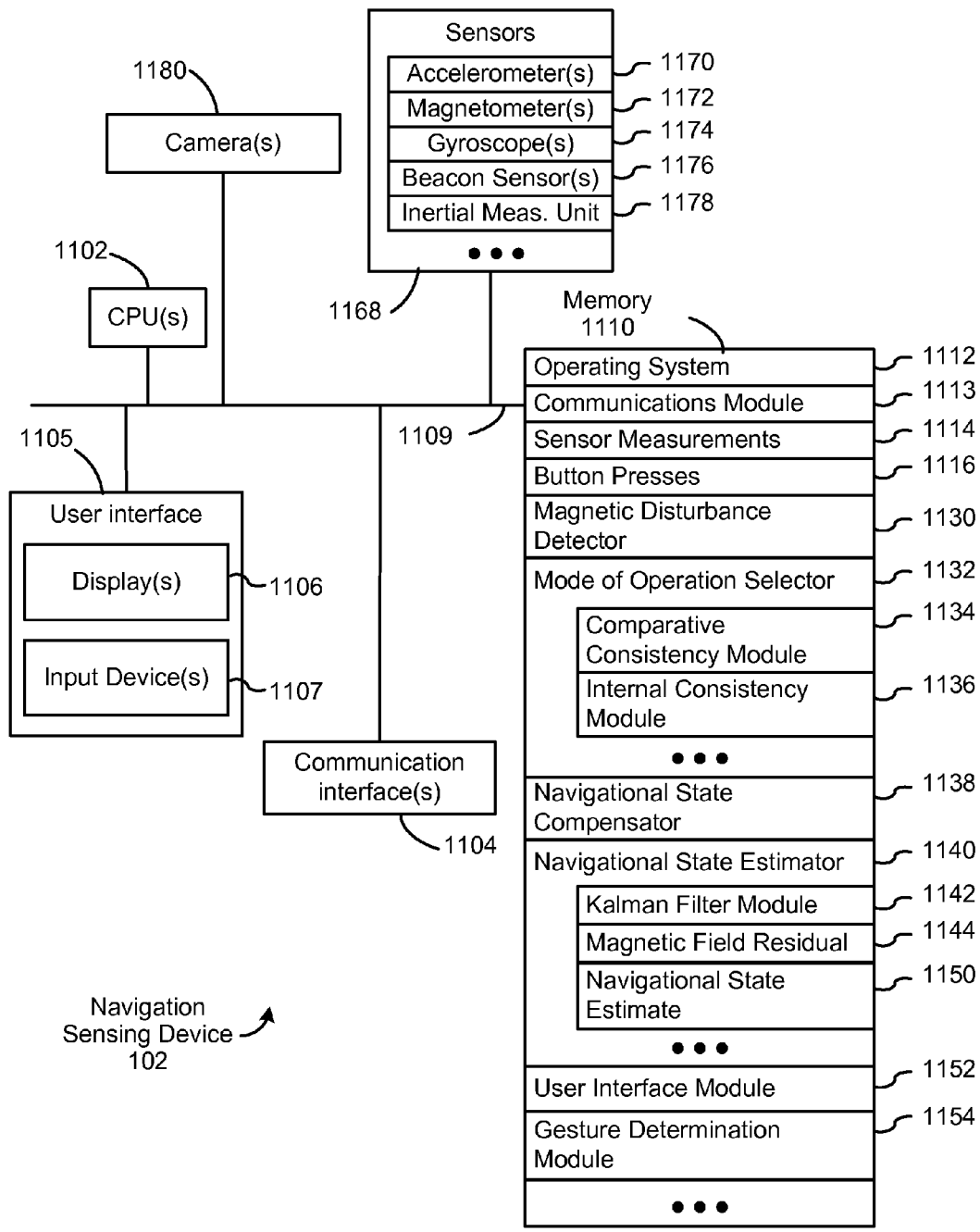
FIG. 6 presents a block diagram of an example navigation sensing device, according to some embodiments.

FIG. 6 is a block diagram of Navigation sensing Device 102 (herein "Device 102"). Device 102 typically includes one or more processing units (CPUs) 1102, one or more network or other Communications Interfaces 1104 (e.g., a wireless communication interface, as described above with reference to FIG. 1), Memory 1110, Sensors 1168 (e.g., Sensors 220 such as one or more Accelerometers 1170, Magnetometers 1172, Gyroscopes 1174, Beacon Sensors 1176, Inertial Measurement Units 1178, Thermometers, Barometers, and/or Proximity Sensors, etc.), one or more Cameras 1180, and one or more Communication Buses 1109 for interconnecting these components. In some embodiments, Communications Interfaces 1104 include a transmitter for transmitting information, such as accelerometer and magnetometer measurements, and/or the computed navigational state of Device 102, and/or other information to Host 101. Communication buses 1109 typically include circuitry (sometimes called a chipset) that interconnects and controls communications between system components. Device 102 optionally includes user interface 1105 comprising Display 1106 (e.g., Display 104 in FIG. 1) and Input Devices 1107 (e.g., keypads, buttons, etc.). Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 optionally includes one or more storage devices remotely located from the CPU(s) 1102. Memory 1110, or alternately the non-volatile memory device(s) within Memory 1110, comprises a non-transitory computer readable storage medium. In some embodiments, Memory 1110 stores the following programs, modules and data structures, or a subset thereof:

Operating System 1112 that includes procedures for handling various basic system services and for performing hardware dependent tasks;

Communication Module 1113 that is used for connecting Device 102 to Host 101 via Communication Network Interface(s) 1104 (wired or wireless); Communication Module 1113 is optionally adapted for connecting Device 102 to one or more communication networks, such as the Internet, other wide area networks, local area networks, metropolitan area networks, and so on;

Sensor Measurements 1114 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);

data representing Button Presses 1116;

Magnetic Disturbance Detector 1130 for detecting disturbances in the local magnetic field of Device 102 (e.g., detecting sudden changes in magnetic field direction that do not correspond to changes in navigational state of Device 102 and/or detecting that the local magnetic field is non-uniform);

Mode of Operation Selector 1132, for selecting a mode of operation for the processing apparatus (e.g., the magnetometer-assisted mode or the alternate mode), which optionally includes Comparative Consistency Module 1134 for determining whether magnetometer measurements are consistent with other sensor measurements and Internal Consistency Module 1136 for determining whether magnetometer measurements are internally consistent (e.g., that Device 102 is in a uniform magnetic field);

Navigational State Compensator 1138 for determining a fixed compensation (e.g., a rotational offset) for compensating for drift in the navigational state estimate while the processing apparatus was in the alternate mode of operation;

Navigation State Estimator 1140 for estimating navigational states of Device 102, optionally including:

Kalman Filter Module 1142 that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector $\hat{x}$ in Equation 10 of U.S. Pat. Pub. No. 2010/0174506), a mapping, Kalman filter matrices, and attitude estimates (e.g., the attitude estimates as obtained from the quaternion in the state vector $\hat{x}$ in Equation 10 of U.S. Pat. Pub. No. 2010/0174506);

Magnetic Field Residual 1144 that is indicative of a difference between a magnetic field detected based on measurements from Magnetometer(s) 1172 and a magnetic field estimated based on Kalman Filter Module 1142; and data representing Navigational State Estimate 1150 (e.g., an estimate of the position and/or attitude of Device 102).

optionally, User Interface Module 1152 that receives commands from the user via Input Device(s) 1107 and generates user interface objects in Display(s) 1106 in accordance with the commands and the navigational state of Device 102, User Interface Module 1152 optionally includes one or more of: a cursor position module for determining a cursor position for a cursor to be displayed in a user interface in accordance with changes in a navigational state of the navigation sensing device, an augmented reality module for determining positions of one or more user interface objects to be displayed overlaying a dynamic background such as a camera output in accordance with changes in a navigational state of the navigation sensing device, a virtual world module for determining a portion of a larger user interface (a portion of a virtual world) to be displayed in accordance with changes in a navigational state of the navigation sensing device, a pedestrian dead reckoning module for tracking movement of Device 102 over time, and other application specific user interface modules; and optionally, Gesture Determination Module 1154 for determining gestures in accordance with detected changes in the navigational state of Device 102.

It is noted that in some of the embodiments described above, Device 102 does not include a Gesture Determination Module 1154, because gesture determination is performed by Host 101. In some embodiments described above, Device 102 also does not include Magnetic Disturbance Detector 1130, Mode of Operation Selector 1132, Navigational State Estimator 1140 and User Interface Module because Device 102 transmits Sensor Measurements 1114 and, optionally, data representing Button Presses 1116 to a Host 101 at which a navigational state of Device 102 is determined.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1102). The above identified modules or programs (i.e., sets of instructions) need not be implemented as separate software programs, procedures or modules, and thus various subsets of these modules may be combined or otherwise re-arranged in various embodiments. In some embodiments, Memory 1110 may store a subset of the modules and data structures identified above. Furthermore, Memory 1110 may store additional modules and data structures not described above.

Although FIG. 6 shows a "Navigation sensing Device 102," FIG. 6 is intended more as functional description of the various features which may be present in a navigation sensing device. In practice, and as recognized by those of ordinary skill in the art, items shown separately could be combined and some items could be separated.

Figure 7:
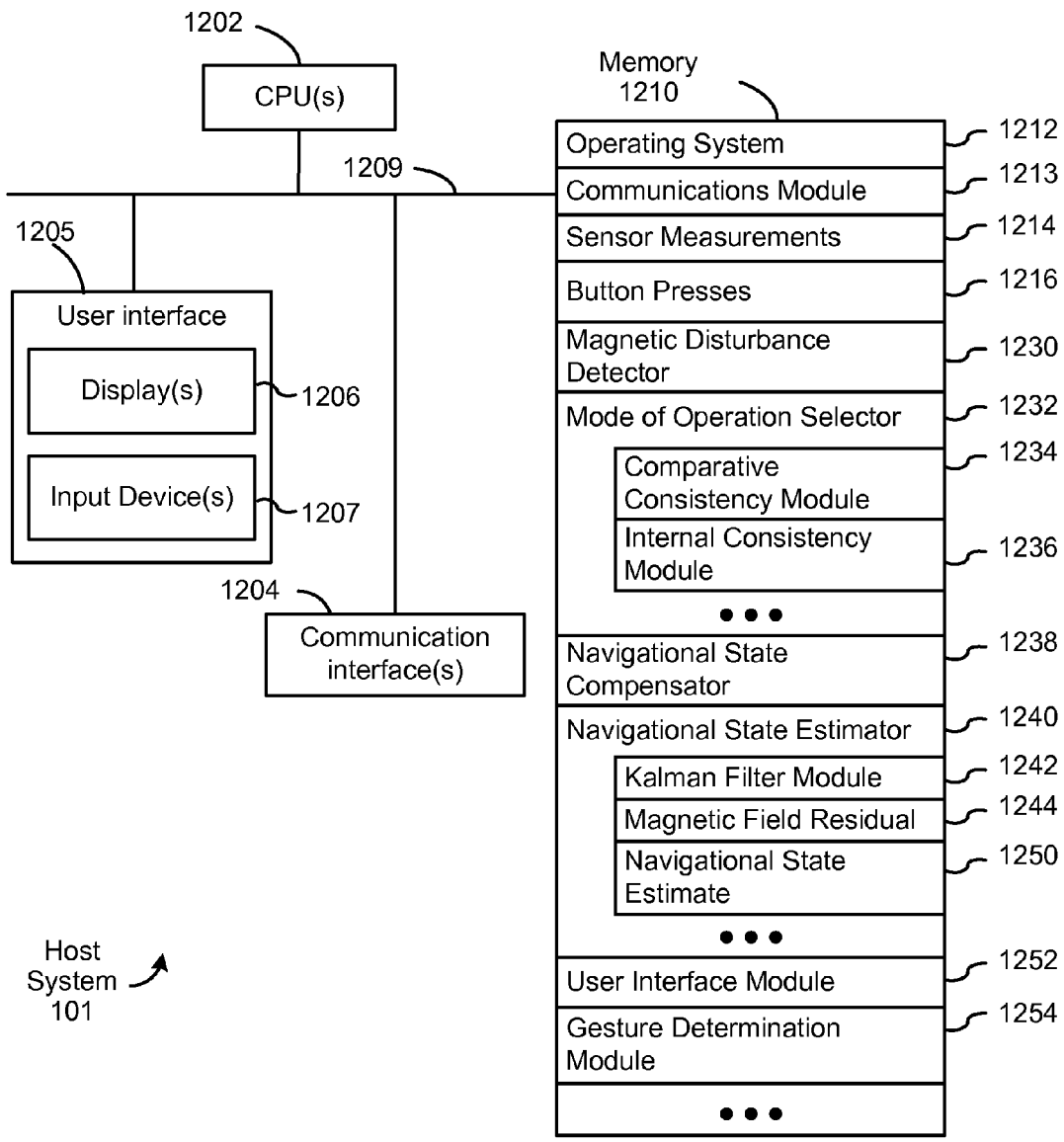
FIG. 7 presents a block diagram of an example host computer system, according to some embodiments.

FIG. 7 is a block diagram of Host Computer System 101 (herein "Host 101"). Host 101 typically includes one or more processing units (CPUs) 1202, one or more network or other Communications Interfaces 1204 (e.g., any of the wireless interfaces described above with reference to FIG. 1), Memory 1210, and one or more Communication Buses 1209 for interconnecting these components. In some embodiments, Communication Interfaces 1204 include a receiver for receiving information, such as accelerometer and magnetometer measurements, and/or the computed attitude of a navigation sensing device (e.g., Device 102), and/or other information from Device 102. Communication Buses 1209 optionally include circuitry (sometimes called a chipset) that interconnects and controls communications between system components. Host 101 optionally includes a User Interface 1205 comprising a Display 1206 (e.g., Display 104 in FIG. 1) and Input Devices 1207 (e.g., a navigation sensing device such as a multi-dimensional pointer, a mouse, a keyboard, a trackpad, a trackball, a keypad, buttons, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 optionally includes one or more storage devices remotely located from the CPU(s) 1202. Memory 1210, or alternately the non-volatile memory device(s) within Memory 1210, comprises a non-transitory computer readable storage medium. In some embodiments, Memory 1210 stores the following programs, modules and data structures, or a subset thereof:

Operating System 1212 that includes procedures for handling various basic system services and for performing hardware dependent tasks;

Communication Module 1213 that is used for connecting Host 101 to Device 102, and/or other devices or systems via Communication Network Interface(s) 1204 (wired or wireless), and for connecting Host 101 to one or more communication networks, such as the Internet, other wide area networks, local area networks, metropolitan area networks, and so on;

Sensor Measurements 1214 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);

data representing Button Presses 1216;

Magnetic Disturbance Detector 1230 for detecting disturbances in the local magnetic field of Device 102 (e.g., detecting sudden changes in magnetic field direction that do not correspond to changes in navigational state of Device 102 and/or detecting that the local magnetic field is non-uniform);

Mode of Operation Selector 1232, for selecting a mode of operation for the processing apparatus (e.g., the magnetometer-assisted mode or the alternate mode), which optionally includes Comparative Consistency Module 1234 for determining whether magnetometer measurements for Device 102 are consistent with other sensor measurements for Device 102 and Internal Consistency Module 1236 for determining whether magnetometer measurements are internally consistent (e.g., that Device 102 is in a uniform magnetic field);

Navigational State Compensator 1238 for determining a fixed compensation (e.g., a rotational offset) for compensating for drift in the navigational state estimate of Device 102 while the processing apparatus was in the alternate mode of operation;

Navigation State Estimator 1240 for estimating navigational states of Device 102, optionally including:

Kalman Filter Module 1242 that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector x̂ in Equation 10 of U.S. Pat. Pub. No. 2010/0174506), a mapping, Kalman filter matrices, and attitude estimates (e.g., the attitude estimates as obtained from the quaternion in the state vector x̂ in Equation 10 of U.S. Pat. Pub. No. 2010/0174506);

Magnetic Field Residual 1244 that is indicative of a difference between a magnetic field detected based on measurements from Magnetometer(s) 1272 and a magnetic field estimated based on Kalman Filter Module 1242; and data representing Navigational State Estimate 1250 (e.g., an estimate of the position and/or attitude of Device 102).

optionally, User Interface Module 1252 that receives commands from the user via Input Device(s) 1207 and generates user interface objects in Display(s) 1206 in accordance with the commands and the navigational state of Device 102, User Interface Module 1252 optionally includes one or more of: a cursor position module for determining a cursor position for a cursor to be displayed in a user interface in accordance with changes in a navigational state of the navigation sensing device, an augmented reality module for determining positions of one or more user interface objects to be displayed overlaying a dynamic background such as a camera output in accordance with changes in a navigational state of the navigation sensing device, a virtual world module for determining a portion of a larger user interface (a portion of a virtual world) to be displayed in accordance with changes in a navigational state of the navigation sensing device, a pedestrian dead reckoning module for tracking movement of Device 102 over time, and other application specific user interface modules; and optionally, Gesture Determination Module 1254 for determining gestures in accordance with detected changes in the navigational state of Device 102.

It is noted that in some of the embodiments described above, Host 101 does not store data representing Sensor Measurements 1214, because sensor measurements of Device 102 are processed at Device 102, which sends data representing Navigational State Estimate 1250 to Host 101. In other embodiments, Device 102 sends data representing Sensor Measurements 1214 to Host 101, in which case the modules for processing that data are present in Host 101.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1202). The above identified modules or programs (i.e., sets of instructions) need not be implemented as separate software programs, procedures or modules, and thus various subsets of these modules may be combined or otherwise re-arranged in various embodiments. The actual number of processors and software modules used to implement Host 101 and how features are allocated among them will vary from one implementation to another. In some embodiments, Memory 1210 may store a subset of the modules and data structures identified above. Furthermore, Memory 1210 may store additional modules and data structures not described above.

Note that method 500 described above is optionally governed by instructions that are stored in a non-transitory computer readable storage medium and that are executed by one or more processors of Device 102 or Host 101. As noted above, in some embodiments these methods may be performed in part on Device 102 and in part on Host 101, or on a single integrated system which performs all the necessary operations. Each of the operations shown in FIGS. 5A-5D optionally correspond to instructions stored in a computer memory or computer readable storage medium. The computer readable storage medium optionally includes a magnetic or optical disk storage device, solid state storage devices such as Flash memory, or other non-volatile memory device or devices. In some embodiments, the computer readable instructions stored on the computer readable storage medium are in source code, assembly language code, object code, or other instruction format that is interpreted or executed by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   at a processing apparatus having one or more processors and memory storing one or more programs that when executed by the one or more processors cause the respective processing apparatus to perform the method,
   generating navigational state estimates for a device having a plurality of sensors, the plurality of sensors including a magnetometer, wherein the processing apparatus has a plurality of modes of operation including:
   a magnetometer-assisted mode of operation in which measurements from the magnetometer are used to estimate the navigational state of the device; and
   an alternate mode of operation in which measurements from a subset of sensors of the plurality of sensors that does not include the magnetometer are used to estimate the navigational state of the device; for a respective time period, operating in the alternate mode of operation; during the respective time period:
   collecting a plurality of magnetometer measurements;
   determining a first estimated direction of the external magnetic field based on the plurality of magnetometer measurements;
   determining a second estimated direction of the external magnetic field based on measurements from one or more of the other sensors and a predetermined relationship between an estimated orientation of the device and the external magnetic field; and
   determining whether the plurality of magnetometer measurements meet predefined measurement-consistency requirements while the first estimated magnetic field is not consistent with the second estimated magnetic field;

in accordance with the determination that the plurality of magnetometer measurements meet predefined measurement-consistency requirements while the first estimated magnetic field is not consistent with the second estimated magnetic field, transitioning to the magnetometer-assisted mode of operation, including adjusting the estimate of the navigational state of the device in accordance with a difference between the first estimated magnetic field and the second estimated magnetic field; and in accordance with the determination that the plurality of magnetometer measurements do not meet predefined measurement-consistency requirements, continuing to operate in the alternate mode of operation.

2. The method of claim 1, wherein the processing apparatus is a component of the device.

3. The method of claim 1, further comprising:
for a prior time period that occurs prior to the respective time period, operating in the magnetometer-assisted mode of operation, using measurements from the plurality of sensors, including the magnetometer, to estimate the navigational state of the device;
during the prior time period, determining whether a current operating environment of the device will distort measurements from the magnetometer; and
in accordance with a determination that the current operating environment of the device will distort measurements from the magnetometer, transitioning to the alternate mode of operation in which measurements from the magnetometer are not used to estimate the navigational state of the device.

4. The method of claim 1, further comprising, after transitioning to the magnetometer-assisted mode of operation, using measurements of the plurality of sensors, including the magnetometer, to estimate the navigational state of the device.

5. The method of claim 1, wherein:
a set of estimated directions of the external magnetic field are determined based on corresponding magnetometer measurements; and
the plurality of magnetometer measurements meet the predefined measurement-consistency requirements when the set of estimated directions have a statistical dispersion below a predefined dispersion threshold.

6. The method of claim 1, wherein:
a set of estimated magnitudes of the external magnetic field are determined based on corresponding magnetometer measurements; and
the plurality of magnetometer measurements meet the predefined measurement-consistency requirements when the set of estimated magnitudes have a statistical dispersion below a predefined dispersion threshold.

7. The method of claim 1, further comprising, while in the alternate mode of operation comparing the first estimated direction with the second estimated direction, wherein the plurality of magnetometer measurements meet the predefined measurement-consistency requirements when the first estimated direction is consistent with the second estimated direction.

8. The method of claim 1, wherein determining whether the plurality of magnetometer measurements meet predefined measurement-consistency requirements includes determining whether the plurality of magnetometer measurements are internally consistent.

9. The method of claim 1, wherein:
a Kalman filter is used to estimate the navigational state of the device in accordance with measurements from sensors in the plurality of sensors;
the Kalman filter includes a magnetic field residual term corresponding to a difference between the estimated magnetic field and the measured magnetic field; and
the method further comprises:
while operating in the magnetometer-assisted mode of operation:
calculating a first value of the magnetic field residual; and
using the first value of the magnetic field residual to estimate the navigational state of the device; and
while operating in the alternate mode of operation:
calculating a second value of the magnetic field residual; and
forgoing use of the second value of the magnetic field residual to estimate the navigational state of the device.

10. The method of claim 9, wherein:
forgoing use of a value of the magnetic field residual to estimate the navigational state of the device includes setting a gain of the magnetic field residual to zero in the Kalman filter; and
the method further comprises, in accordance with a determination that the magnetic field residual has decreased below a predefined minimum threshold, increasing the gain of the magnetic field residual to a non-zero value.

11. The method of claim 1, further comprising:
comparing the plurality of magnetometer measurements to one or more models of predefined magnetic disturbances; and
in accordance with a determination that the plurality of magnetometer measurements are consistent with a respective model of the one or more models:
retrieving information about a respective predefined magnetic disturbance that corresponds to the respective model; and
adjusting operation of the processing apparatus in accordance with the information about the respective predefined magnetic disturbance.

12. The method of claim 11, wherein adjusting operation of the processing apparatus includes:
determining a difference between the magnetic field measured by the magnetometer and a magnetic field predicted in accordance with measurements from the subset of sensors; and
adjusting the estimate of the navigational state of the device in accordance with the determined difference.

13. A computer system, comprising:
a processing apparatus including one or more processors and memory; and
one or more programs, wherein the one or more programs are stored in the memory and configured to be executed by the one or more processors, the one or more programs including instructions for:
generating navigational state estimates for a device having a plurality of sensors, the plurality of sensors including a magnetometer, wherein the processing apparatus has a plurality of modes of operation including:
a magnetometer-assisted mode of operation in which measurements from the magnetometer are used to estimate the navigational state of the device; and
an alternate mode of operation in which measurements from a subset of sensors of the plurality of sensors that does not include the magnetometer are used to estimate the navigational state of the device; and for a respective time period, operating the processing apparatus in the alternate mode of operation;

during the respective time period:
collecting a plurality of magnetometer measurements;
determining a first estimated direction of the external magnetic field based on the plurality of magnetometer measurements;
determining a second estimated direction of the external magnetic field based on measurements from one or more of the other sensors and a predetermined relationship between an estimated orientation of the device and the external magnetic field; and
determining whether the plurality of magnetometer measurements meet predefined measurement-consistency requirements while the first estimated magnetic field is not consistent with the second estimated magnetic field;

in accordance with the determination that the plurality of magnetometer measurements meet predefined measurement-consistency requirements while the first estimated magnetic field is not consistent with the second estimated magnetic field, transitioning to the magnetometer-assisted mode of operation, including adjusting the estimate of the navigational state of the device in accordance with a difference between the first estimated magnetic field and the second estimated magnetic field; and in accordance with the determination that the plurality of magnetometer measurements do not meet predefined measurement-consistency requirements, continuing to operate the processing apparatus in the alternate mode of operation.

14. The computer system of claim 13, wherein the one or more programs include instructions for:

for a prior time period that occurs prior to the respective time period, operating in the magnetometer-assisted mode of operation, using measurements from the plurality of sensors, including the magnetometer, to estimate the navigational state of the device;

during the prior time period, determining whether a current operating environment of the device will distort measurements from the magnetometer; and in accordance with a determination that the current operating environment of the device will distort measurements from the magnetometer, transitioning to the alternate mode of operation in which measurements from the magnetometer are not used to estimate the navigational state of the device.

15. The computer system of claim 13, wherein the one or more programs include instructions for, while in the alternate mode of operation comparing the first estimated direction with the second estimated direction, wherein the plurality of magnetometer measurements meet the predefined measurement-consistency requirements when the first estimated direction is consistent with the second estimated direction.

16. The computer system of claim 13, wherein determining whether the plurality of magnetometer measurements meet predefined measurement-consistency requirements includes determining whether the plurality of magnetometer measurements are internally consistent.

17. A non-transitory computer readable storage medium storing one or more programs, the one or more programs comprising instructions, which when executed by a processing apparatus with one or more processors, cause the processing apparatus to:

generate navigational state estimates for a device having a plurality of sensors, the plurality of sensors including a magnetometer, wherein the processing apparatus has a plurality of modes of operation including:
a magnetometer-assisted mode of operation in which measurements from the magnetometer are used to estimate the navigational state of the device; and
an alternate mode of operation in which measurements from a subset of sensors of the plurality of sensors that does not include the magnetometer are used to estimate the navigational state of the device; and for a respective time period, operate the processing apparatus in the alternate mode of operation;

during the respective time period:
collect a plurality of magnetometer measurements;
determine a first estimated direction of the external magnetic field based on the plurality of magnetometer measurements;
determine a second estimated direction of the external magnetic field based on measurements from one or more of the other sensors and a predetermined relationship between an estimated orientation of the device and the external magnetic field; and
determine whether the plurality of magnetometer measurements meet predefined measurement-consistency requirements while the first estimated magnetic field is not consistent with the second estimated magnetic field;

in accordance with the determination that the plurality of magnetometer measurements meet predefined measurement-consistency requirements while the first estimated magnetic field is not consistent with the second estimated magnetic field, transition to the magnetometer-assisted mode of operation, including adjusting the estimate of the navigational state of the device in accordance with a difference between the first estimated magnetic field and the second estimated magnetic field; and in accordance with the determination that the plurality of magnetometer measurements do not meet predefined measurement-consistency requirements, continue to operate the processing apparatus in the alternate mode of operation.

18. The non-transitory computer readable storage medium of claim 17, further comprising instructions to:

for a prior time period that occurs prior to the respective time period, operating in the magnetometer-assisted mode of operation, use measurements from the plurality of sensors, including the magnetometer, to estimate the navigational state of the device;

during the prior time period, determine whether a current operating environment of the device will distort measurements from the magnetometer; and in accordance with a determination that the current operating environment of the device will distort measurements from the magnetometer, transition to the alternate mode of operation in which measurements from the magnetometer are not used to estimate the navigational state of the device.

19. The non-transitory computer readable storage medium of claim 17, further comprising instructions to compare the first estimated direction with the second estimated direction, wherein the plurality of magnetometer measurements meet the predefined measurement-consistency requirements when the first estimated direction is consistent with the second estimated direction.

20. The non-transitory computer readable storage medium of claim 17, wherein determining whether the plurality of magnetometer measurements meet predefined measurement-consistency requirements includes determining whether the plurality of magnetometer measurements are internally consistent.

* * * * *